(12) United States Patent
Krüger et al.

(10) Patent No.: US 9,148,359 B2
(45) Date of Patent: *Sep. 29, 2015

(54) CORRELATION OF MEDIA PLANE AND SIGNALING PLANE OF MEDIA SERVICES IN A PACKET-SWITCHED NETWORK

(75) Inventors: Michael Krüger, Hamburg (DE); Hendrik Scholz, Hamburg (DE)

(73) Assignee: Voipfuture GmbH, Hamburg (DE)

(*) Notice: Subject to any disclaimer, the term of this patent is extended or adjusted under 35 U.S.C. 154(b) by 785 days.

This patent is subject to a terminal disclaimer.

(21) Appl. No.: 13/334,870

(22) Filed: Dec. 22, 2011

(65) Prior Publication Data

US 2013/0163446 A1    Jun. 27, 2013

(51) Int. Cl.
*H04L 12/26* (2006.01)
*H04L 12/24* (2006.01)
*H04L 29/06* (2006.01)

(52) U.S. Cl.
CPC ............. *H04L 43/12* (2013.01); *H04L 41/5032* (2013.01); *H04L 43/062* (2013.01); *H04L 43/106* (2013.01); *H04L 43/16* (2013.01); *H04L 65/1006* (2013.01)

(58) Field of Classification Search
None
See application file for complete search history.

(56) References Cited

U.S. PATENT DOCUMENTS

| 6,718,023 | B1 | 4/2004 | Zolotov | |
|---|---|---|---|---|
| 7,463,634 | B1 | 12/2008 | Hansen | |
| 2004/0177276 | A1* | 9/2004 | MacKinnon et al. | 713/201 |
| 2006/0250988 | A1* | 11/2006 | Garcia et al. | 370/260 |
| 2008/0151918 | A1 | 6/2008 | Foti | |
| 2009/0109879 | A1* | 4/2009 | Kuusinen et al. | 370/260 |
| 2009/0240803 | A1* | 9/2009 | Iwakawa | 709/224 |
| 2009/0303897 | A1 | 12/2009 | Kouretas et al. | |
| 2010/0131658 | A1* | 5/2010 | Goyal et al. | 709/228 |
| 2011/0216762 | A1* | 9/2011 | Nas | 370/352 |
| 2011/0252127 | A1* | 10/2011 | Iyengar et al. | 709/224 |
| 2014/0089504 | A1* | 3/2014 | Scholz et al. | 709/224 |

OTHER PUBLICATIONS

Ericsson: "Requirements on Session Identifiers", 3GPP Draft; S2-081827-Rev-S2-081450 MMSC; vol. SA WG2, no. Athens; Feb. 22, 2008.
FIPS PUB-180, "Secure Hash Standard (SHS)", 2008 available at http://www.itl.nist.gov/fipspubs/).

(Continued)

*Primary Examiner* — Jae Y Lee
*Assistant Examiner* — Andrew Oh
(74) *Attorney, Agent, or Firm* — Wood, Phillips, Katz Clark & Mortimer

(57) ABSTRACT

This invention relates to methods for correlating at least one media path and a signaling session of a packet-switched network and to an implementation of these methods in hardware and software. To overcoming one or more of the limitations and challenges on the correlation of signaling plane and media plane of services, the invention defines a key, which can be used for correlation of media streams and signaling sessions. The invention is based on a signaling probe identifying new services and associated media paths of the media plane by detecting their corresponding signaling sessions and determining for each service a signaling session identifier. The signaling probe registers the signaling sessions and their media paths at a correlation unit using the signaling session identifiers as a key, which allows a media probe to query the correlation unit for respective signaling session identifiers that correspond to media paths detected in the media plane traffic.

14 Claims, 14 Drawing Sheets

(56) References Cited

OTHER PUBLICATIONS

MD5 Message-Digest Algorithm, B. Rivest, MIT Laboratory for Computer Science and RSA Data Security, Inc., Apr. 1992.
IP Network Address Translator (NAT), K. Egevang, Cray Communications, P. Francis NTT, May 1994.
Address Allocation for Private Internets, Y. Rekhter et al., Silicon Graphics, Inc., Feb. 1996.
Internet Protocol, Version 6 (IPv6) Specification, S. Deering et al., Dec. 1998.
SIP: Session Initiation Protocol, J. Rosenberg et al., At&T, Jun. 2002.
An Offer/Answer Model with the Session Description Protocol (SDP), J. Rosenberg et al., Columbia U., Jun. 2002.
RTP—Real-time A Transport Protocol, see IETF RFC 3550, "RTP: A Transport Protocol for Real-Time Applications", available at http://www.ietf.org.
MSRP—see IETF RFC 4975, "The Message Session Relay Protocol (MSRP)", available at http://www.ietf.org.
IETF RFC 5245, "Interactive Connectivity Establishment (ICE): A Protocol for Network Address Translator (NAT) Traversal for Offer/Answer Protocols" (all RFCs available at http://www.ietf.org).
IETF RFC 5766, "Traversal Using Relays around NAT (TURN): Relay Extensions to Session Traversal Utilities for NAT (STUN)") addresses or ICE (Interactive Connection Establishment).
RFC 768, "User Datagram Protocol", available at http://www.ietf.org.
ITU recommendation T.38 (see T.38, "Procedures for real-time Group 3 facsimile communication over IP networks", Edition 5 (2007) or Edition 6 (2010), available at http://www.itu.int).

\* cited by examiner

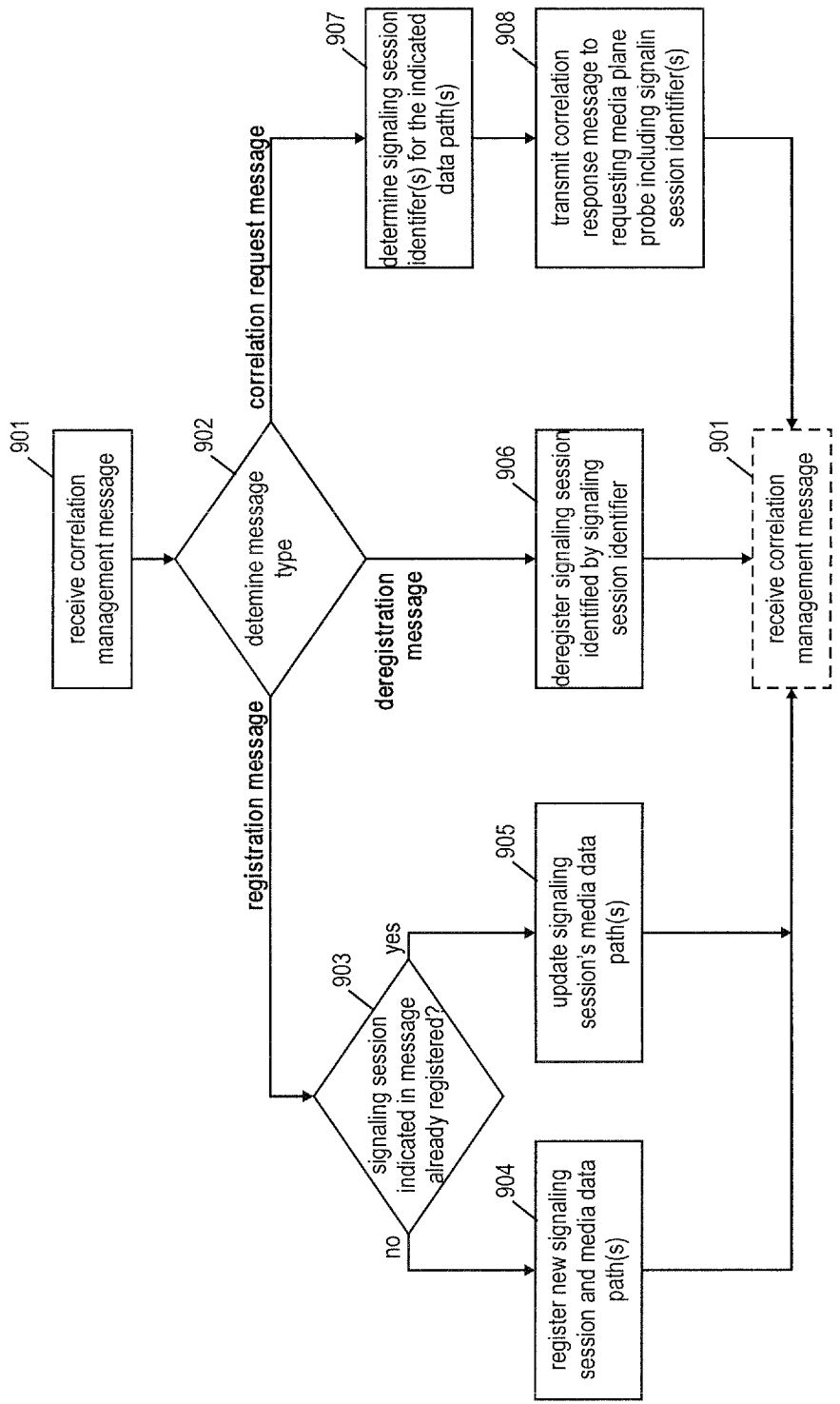

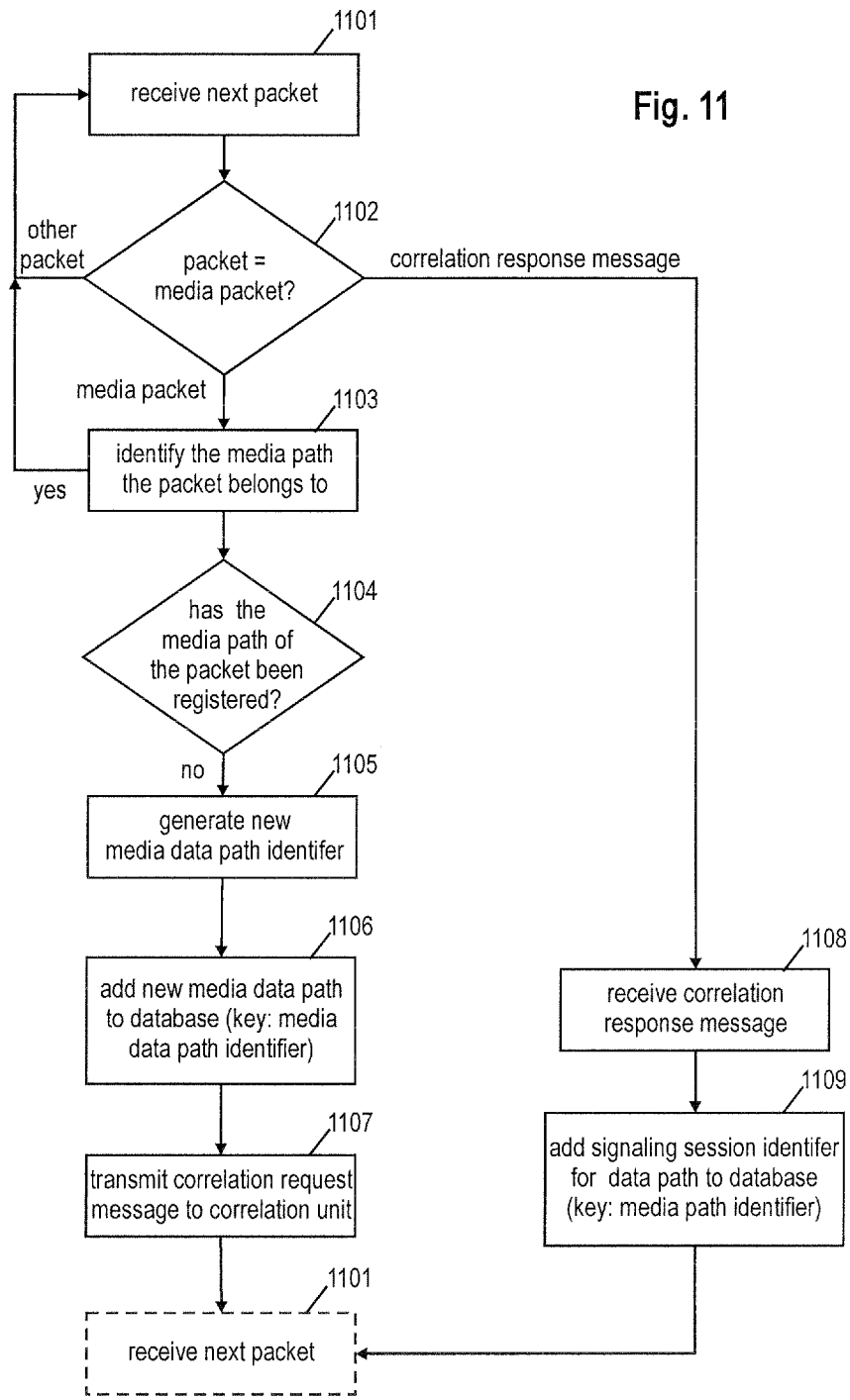

| CORR_MSG_XDRINFO | CORR_MSG_LENGTH |
|---|---|
| SSID ||
| Media Data Path # 1 ||
| ⋮ ||
| Media Data Path # N ||

Fig. 14

| CORR_MSG_XDRINFO | CORR_MSG_LENGTH |
|---|---|
| SSID ||
| Media Data Path # 1 | RI #1 |
| ⋮ ||
| Media Data Path # N | RI #N |

Fig. 15

| CORR_MSG_XDREOC | SSID |
|---|---|

Fig. 16

| CORR_MSG_REQUEST | MDP ID |
|---|---|
| Media Data Path ||

Fig. 17

| CORR_MSG_REQUEST | CORR_MSG_LENGTH |
|---|---|
| Media Data Path # 1 | MDP ID #1 |
| ⋮ ||
| Media Data Path # N | MDP ID #N |

Fig. 18

| CORR_MSG_RESPONSE | MDP ID |
|---|---|
| SSID ||

Fig. 19

| CORR_MSG_RESPONSE | CORR_MSG_LENGTH |
|---|---|
| SSID # 1 | MDP ID #1 |
| ⋮ ||
| SSID # N | MDP ID #N |

Fig. 20

CORRELATION OF MEDIA PLANE AND SIGNALING PLANE OF MEDIA SERVICES IN A PACKET-SWITCHED NETWORK

FIELD OF THE INVENTION

This invention relates to methods for correlating at least one media data path and a signaling session of a service in a passive monitoring system of a packet-switched network. Furthermore, the invention also relates to an implementation of these methods in hardware and software, and provides a signaling plane probe, a media plane probe and a correlation unit.

TECHNICAL BACKGROUND

VoIP Services

VoIP ("Voice over IP"—IP denoting the Internet Protocol) services may be considered to consist of a signaling plane and a media plane. On the signaling plane various protocols describe the session (call) flow in terms of involved parties, intermediary VoIP entities (i.e. VoIP proxies, routers) and the characteristics of the VoIP service (call). The media plane typically carries the media information (i.e. audio and/or video data) between the involved parties. Neither the media plane nor the signaling plane alone is sufficient to carry a VoIP service. On the signaling plane protocols like SIP (see IETF RFC 3261, "SIP: Session Initiation Protocol", available at http://www.ietf.org) or ITU-T recommendation H.323 (see H.323, "Packet-based multimedia communications systems". Edition 7, 2009, available at http://www.itu.int) are commonly used, whereas protocols like RTP (Real-time Transport Protocol, see IETF RFC 3550, "RTP: A Transport Protocol for Real-Time Applications", available at http://www.ietf.org), MSRP (see IETF RFC 4975, "The Message Session Relay Protocol (MSRP)", available at http://www.ietf.org) or ITU recommendation T.38 (see T.38, "Procedures for real-time Group 3 facsimile communication over IP networks", Edition 5 (2007) or Edition 6 (2010), available at http://www.itu.int) may be present on the media plane.

In contrast to the traditional PSTN (Public Switched Telephone Network) network both planes may be on different infrastructure using different protocols and even take different routes through a network.

Correlation Information

The property of disjunct signaling stream(s) and media stream(s) of a VoIP service within packet-switched networks may necessitate a correlation mechanism. This correlation may only be based on the common parameters carried on both planes of the session.

In RTP-based VoIP networks the data basis is rather limited as defined by the RTP protocol and the underlying transport and Internet layer protocols. A RTP stream which typically carries voice or video information from one party to another of a VoIP service is made up of plural RTP packets. The RTP headers of each RTP packet do not contain an identifier which can be used to distinctively associate single RTP packets or the entire RTP stream to a VoIP service (defined by the VoIP signaling). The same way the VoIP signaling protocols do not carry information to relate a signaling session (signaling plane of the VoIP service) to RTP protocol header information.

The parties originating or receiving a VoIP service actively dictate the transport and Internet layer address (IP address and port) on which they want to receive media streams. This configuration is done on the signaling plane. Using SIP as a signaling protocol, the address tuple(s) to be used on the media plane is/are defined in a so-called SDP body (see IETF RFC 3264, "An Offer/Answer Model with the Session Description Protocol (SDP)", available at http://www.ietf.org). The address tuple(s)—usually consisting of an IP address and port—is/are the sole information to correlate media plane of a VoIP service with the signaling plane of the VoIP service, and vice versa.

Challenges in Correlation of Signaling Plane and Media Plane

Bedsides the limited information available for correlation, the correlation of the signaling plane and media plane imposes also numerous further challenges. While an address tuple (IP address and port) may be enough information to identify a single RTP stream at a given point in time, multiple streams identified by different address tuples may exist in a regular VoIP call. In fact at least two media streams are needed to allow two-way communication between the caller and callee.

It will be outlined in further detail in the following how multiple media streams may occur in a single VoIP service and how they are communicated between the parties involved (which may not always be the case).

Time Constraints Due to Port Reuse

The IP address and port combination transmitted inside the signaling plane of a VoIP service as well as the IP address and port observed on the media plane of the VoIP service may be reused. For exemplary purposes it can be assumed that each VoIP device has a single IP address. The port range from which the client can draw is limited to roughly 65000 ports by the underlying transport layer protocol UDP (see RFC 768, "User Datagram Protocol", available at http://www.ietf.org). In practice additional specifications and configuration parameters significantly further limit this port range.

As a result a VoIP device has to re-use a certain IP address and port combination, thus eliminating a unique identification criterion. Essentially the IP address and port combination can only be assumed to be unique for a limited amount of time. The time-frame depends on the utilization of the VoIP device as well as the number of IP addresses required in an Internet Service Provider's network. If a correlation of the signaling and media plane takes place without a time criteria, it would therefore produce so-called false positives: Multiple media streams would match the requested IP address and port combination, since the signaling plane may have caused re-use of the very same IP address and/or port for another VoIP service.

Media Streams

Multiple streams may exist per direction of each VoIP service. The caller sends data to the callee and vice versa resulting in at least one media stream per direction. Desirable features, such as for example codec changes, may trigger additional streams.

FIG. 1 shows exemplary situations where multiple media streams may be triggered. The focus is on the media plane traffic and its timing. The x-axis denotes the time basis, starting on the left side. The vertical lines in FIG. 1 denote signaling events and the bold horizontal lines are RTP streams present in the respective exemplified VoIP service example (please note that the different VoIP service examples are separated by broken horizontal lines). Only the RTP stream direction from the callee to the caller is shown per VoIP service example. The RTP stream from the caller to the callee can be assumed to be less complex (e.g. as shown in the "normal" VoIP service example).

The three vertical lines denote important events in the phase of a call. The leftmost line denotes the start time-stamp.

This is the time at which the caller submitted the call setup request to the network. The connected point is the time-stamp at which a callee or his endpoint/handset picked and moved the service into a fully established state. The service ends when one of the parties sends a termination request.

The most common VoIP services will be the trivial session examples where there is only one RTP stream per direction (see "normal" or "early media"). In a "normal" VoIP service flow both parties only start sending once the session is fully established on the signaling plane. More often the callee would start sending early media, i.e. when sending ring-tones or (pre-call) announcements. In "session forking" VoIP service example there may be multiple concurrent or sequential RTP streams at the beginning of a service e.g. due ring-tones being sent to multiple VoIP devices of the callee, while one is answered at the connect event During a session media codecs may be changed (see "code change" VoIP service example) which is commonly resulting in a new media stream. Another service scenario may be the VoIP call being put on hold and picked up at a later time essentially generating multiple media streams (see "call on hold" VoIP service example). Silence suppression and other RTP features may cause multiple streams sporadically during a service (see "silence suppression" VoIP service example). Also retransmissions on the signaling plane may desynchronize the signaling plane and media plane (see "SIP retransmissions" VoIP service examples).

Geographic Distribution or Media Plane and Signaling Plane

As indicated above, signaling plane data and media plane data of VoIP services may take different routes. In examples, where SIP is used for session setup, this is indeed the case as those sessions usually contain signaling-only components (i.e. SIP proxies, REGISTRARs). As a result mid-point monitoring solutions may be split geographically along the routes of the VoIP traffic.

An exemplary mid-point monitoring scenario for this case is shown in FIG. 2. FIG. 2 shows three geographically distributed POPs (Point of Presence) which are linked over the carrier's internal network. The signaling data flows on the signaling plane between POP A and B via the signaling-only POP C. POP C would typically host a centralized routing entity which reduces the complexity in the POPs A and B. To prevent back-hauling traffic from POP A to POP C before sending it to POP B the VoIP system is configured in a way that would allow the media to flow directly on the media plane between POPs A and B.

Typical mid-point monitoring locations would be inside each POP. Due to the layout of the network no media traffic would be visible in POP C. To allow for successful correlation of signaling and media streams the correlation mechanism it is therefore desirable to support distributed networks. If the same session traverses multiple POPs the correlation mechanism would be desirable to identify this and support correlation of the session legs across multiple sites.

Limitations/Challenges in Correlation of Signaling Plane and Media Plane

The correlation may be solely based on the IP address and port used on the transport and Internet layer. On the media plane each RTP stream is destined to exactly one IP address and port on the transport layer. On the signaling plane one IP address and port is typically exchanged inside the Session Description Body of the SDP protocol during the VoIP service setup. However this IP address and port combination may not be the combination used throughout the VoIP service. In this case the above mentioned correlation mechanism fails: It fails upon searching a media stream for a specific signaling session of the VoIP service. The same way it fails to locate a signaling session of the VoIP service for a specific media stream on the media plane. The reasons for using another IP address port combination than advertised upon session setup are manifold.

Network Address Translation (NAT)

Network Address Translation (NAT, RFC1631) was developed to solve Internet address space depletion and routing problems. In today's Internet one may distinguish between internal addresses which are of only unique locally (i.e. typically used inside company or home networks), and external addresses of global validity and uniqueness as used on the public Internet.

FIG. 3 shows an exemplary network using internal and external addresses. The internal network on the left side uses IP addresses from the so-called private space, as for example defined in IETF RFC 1918, "Address Allocation for Private Internets", available at http://www.ietf.org. The external network on the right side is the public Internet with globally reachable addresses. A router with embedded Network Address Translation (NAT) functionality is located in between the two networks. The router does not directly route packets in between the two connected networks, but "translates" (i.e. replaces) IP source and destination addresses within the routed IP packets on demand.

Essentially, the NAT functionality of the router hides the entire internal network (10.0.0.0/8 in this example) behind one public IP address (192.0.2.1). Every IP connection from within the internal network to the Internet will seem to originate from the sole public IP address (192.0.2.1) of the entire network.

For each node inside the internal network this imposes some limitations. Although Internet access works in general, a node in the internal network may not be reachable from the outside. This is due to the fact that IP traffic from an outside node (i.e. a node in the external network) would be destined to the public IP address (192.0.2.1), but the router with this IP address does not know at this point in time where to forward the traffic to on the internal network, given that there was no prior communication from an node inside of the internal network and the external node.

Additionally the internal node may not be aware that it is behind a router which performs the NAT. As required by the transport protocols, the internal node will use the internal IP address for communication purposes. On the VoIP signaling and media layer (i.e. session layer or application layer), however, the application will also use the internal IP address (i.e. 10.0.0.123) instead of the public IP address. VoIP signaling protocols (e.g. SIP or H.323) contain various IP addresses on the application layer. An intermediary NAT device (i.e. the router in FIG. 3) will not perform translation of the addresses on the session layer or application layer, but only translates IP addresses in the network layer. The internal IP addresses inside the VoIP signaling (i.e. SIP or H.323 messages) impose a problem to the application as internal IP addresses are most likely not reachable from the public Internet.

VoIP devices involved in the processing of a certain call may detect this problem by comparing the IP addresses seen on the Internet and transport layers with the IP addresses set on the application layer. The following message is an exemplary SIP message as seen on the network and transport layer, which means that both the Internet and transport layer information (IP addresses and ports) are visible:

U     2010/09/09     13:57:31.925226     192.0.2.99: 37682→10.0.0.1:5060

The Internet and transport layers show that the UDP packet (U) was received from the external address 192.0.2.99 (port 37682).

The following message represents the same exemplary SIP message as seen on the application layer, which means that both the Internet and transport layer information (IP addresses and ports) as well as the application layer (SIP message contents) are visible:

```
INVITE sip:echo@example.com SIP/2.0
Via: SIP/2.0/UDP
192.168.1.216;branch=z9hG4bK3BB64874;rport=37682;received=
192.0.2.99
CSeq: 7726 INVITE
To: <sip:echo@example.com>
Content-Type: application/sdp
From: "Max Mustermann"
<sip:mmustermann@example.com>;tag=693C7725
Call-ID: 1341723561@192.168.1.216
Subject: sip:mmustermann@example.com
Content-Length: 230
User-Agent: kphone/4.2
Contact: "Max Musterman"
<sip:mmustermann@192.168.1.216;transport=udp>
v=0
o=username 0 0 IN IP4 192.168.1.216
s=The Funky Flow
c=IN IP4 192.168.1.216
t=0 0
m=audio 60942 RTP/AVP 0 97 8 3
a=rtpmap:0 PCMU/8000
a=rtpmap:3 GSM/8000
a=rtpmap:8 PCMA/8000
a=rtpmap:97 iLBC/8000
a=fmtp:97 mode=30
```

In contrast to the information available at the network and transport layers claiming that the message was received from the external address 192.0.2.99 (port 37682), the application claims that the source was the internal address 192.168.1.216 (port 5060—the port 5060 is not viewed for the source address as it is the default port).

In general the translation of the network (IP) address also applies to the port numbers which are used on the transport layer. This feature is named Port Address Translation (PAT). NAT and PAT commonly happen at the same time in the same device.

PAT becomes necessary if multiple devices attempt to use the same port. Since different devices have different IP addresses their IP address and port tuple is unique. If packet streams from both devices traverse the same NAT device, the NAT device has to translate the port of one of the two packet streams. Otherwise there would be two distinct packet streams sharing the same external IP address of the NAT device and the same port. While this may not be a problem if the destination IP address and port tuple of the destination device are different for the two packet streams, it adds overhead which the NAT device wants to prevent. By rewriting the source port of one of the packet streams the address tuples of the external IP address and ports become unique again.

However, in networks where NAT (and PAT) is performed to for example hide private networks from the outside Internet, the correlation of signaling sessions of VoIP services and the associated media plane streams is becoming complex.

Multiple Communication Paths

Numerous solutions have been developed to allow traffic of VoIP services to operate in networks with Network Address Translation (NAT). These mechanisms require the involved caller and callee to exchange information, for instance on additional transport protocols or addresses which can be used to reach the remote party. These include—but are not limited to—IPv6 (Internet Protocol Version 6, see IETF RFC 2460, "Internet Protocol, Version 6 (IPv6), Specification"), TURN (Traversal Using Relays around NAT, see IETF RFC 5766, "Traversal Using Relays around NAT (TURN):Relay Extensions to Session Traversal Utilities for NAT (STUN)") addresses or ICE (Interactive Connection Establishment, see IETF RFC 5245, "Interactive Connectivity Establishment (ICE): A Protocol for Network Address Translator (NAT) Traversal for Offer/Answer Protocols") candidates (all RFCs available at http://www.ietf.org).

These additional tuples of IP addresses and ports communicated in these solutions establish different data paths in media plane and signaling plane of a VoIP service and thereby break up the previous one-to-one relation of signaling session to media stream to a given VoIP device. Previously one media stream to the given VoIP device could be distinctively identified by exactly one IP address and port. In the new scenario on the signaling plane a list of IP address and port tuples is transported on which the VoIP device may receive media thereby increasing the complexity of correlation between media plane and signaling plane of a VoIP service.

SUMMARY OF THE INVENTION

One object of the invention is to suggest correlation mechanisms that allow overcoming one or more of the limitations and challenges on the correlation of signaling plane and media plane of services.

The object is solved by the subject matter of the independent claims. Advantageous embodiments of the invention are subject to the dependent claims.

One of the various aspects of the invention is the definition of a key, which can be used for correlation of media streams and signaling sessions. This key is called "signaling session identifier" herein. The correlation mechanism according to one aspect of the invention is based on a probe monitoring the signaling plane traffic of services (i.e. a signaling plane probe) identifying new services and associated media data paths of the media plane by detecting their corresponding signaling sessions and determining for each service a signaling session identifier for each signaling session of a given service. The signaling plane probe registers the signaling sessions and their media data paths at a correlation unit in the network using the signaling session identifiers as a key, which allows a probe monitoring the media plane traffic of services (i.e. a media plane probe) to query the correlation unit for respective signaling session identifiers that correspond to media data paths detected in the media plane traffic monitored by the media plane probe thereby establishing the correlation between given media paths and signaling sessions of the services. A media data path may be for example indicated by a destination IP address and port number comprised by packets conveying media plane data of a service, if transport layer and network layer information is used to identify the media data path.

One exemplary embodiment of the correlation mechanism is provided by a method for correlating at least one media data path and a signaling session of a service in a passive monitoring system of a packet-switched network. In this method the signaling plane probe located in the packet-switched network detects/identifies a signaling session of a service. The identification of the signaling session comprises identifying also one or more media data paths of the media plane of the service based on signaling information of the signaling session monitored at the signaling plane probe.

The signaling plane probe further generates a signaling session identifier for the signaling session of the service and registers the signaling session at a correlation unit. The signaling session identifier may be for example implemented as a hash value generated by the signaling plane probe. Registration of the signaling session is achieved by transmitting a registration message from the signaling plane probe to the correlation unit. The registration message comprises the signaling session identifier of the signaling session and the one or more media data paths of the service identified by the signaling plane probe.

The correlation unit receives a correlation request message from a media plane probe located in the packet-switched network. The correlation request message indicates a media data path. The correlation unit determines whether a signaling session of a service for the media data path comprised within the correlation request message is registered at the correlation unit, and if so, transmits a correlation response message from the correlation unit to the media plane probe. The correlation response message comprises the determined signaling session identifier of the signaling session associated with the media data path comprised within the correlation request message.

Further, in another embodiment of the invention the registration of the signaling session at the correlation unit comprises the correlation unit storing the generated signaling session identifier the associated one or more media data paths of the service as indicated in the registration message in a database. Moreover, the correlation unit determines whether a signaling session of the service for the media data path comprised within the correlation request message is registered at the correlation unit comprises checking by the correlation unit, whether the media data path comprised within the correlation request message is stored in the database.

In another embodiment of the invention, the correlation unit obtains the signaling session identifier associated to the media data path indicated in the correlation request message.

In a further embodiment of the invention, the signaling plane probe detects the signaling session of the service by monitoring signaling information of SIP packets monitored by the signaling plane probe.

According to another exemplary embodiment the media plane probe temporarily stores the signaling session identifier comprised in the correlation response message and, the associated media data path comprised in the correlation request. Furthermore, in a further more detailed exemplary implementation the media plane probe may perform, on an impairment interval-basis, an impairment analysis of media streams of the media plane of the service, thereby obtaining for each media stream impairment records for the respective impairment intervals, and further stores the at least those impairment records indicating an impairment of a media stream of the service in a media report database. Each stored impairment record comprises the media session identifier of the signaling session of the service to which the respective impaired media stream belongs.

In another embodiment of the invention, the signaling probe generates a signaling session report for the signaling session of the service. The session report comprises the signaling session identifier (and other information on the signaling session of the service), and is stored in session report database.

The method according to a further embodiment of the invention further suggests that the signaling plane probe detects another media data path of the media plane of the service based on signaling information of the service monitored in the signaling probe and after having registered the signaling session of the service at the correlation unit. The signaling probe registers the other media data path of the media plane of the service at the correlation unit by transmitting another registration message from the signaling plane probe to the correlation unit. The registration message comprises the other media data path of the media plane of the service and the signaling session identifier of the signaling session of the service. The correlation unit (in response to the registration message) updates the registration of the signaling session of the service to account for the other media data path. Please note that this "update mechanism" will cause multiple media data paths of a given service to be associated to the same signaling session identifier.

In another exemplary implementation of another embodiment of the invention, the signaling plane probe (temporarily) stories signaling session identifiers generated for different services along with information on the respective signaling sessions of services, and identifies a signaling session identifier associated to the service for which the other data path has been detected based on the stored information on the signaling sessions of services.

In another exemplary embodiment, the correlation request message comprises a destination IP address and port number as well as a source IP address and port number of packets conveying media plane data of a service. The correlation unit may register a new media data path indicated by the source IP address and port number within the correlation request message for the signaling session of the service, if the correlation unit has determined that the signaling session of the service for the media data path indicated by the destination IP address and port number comprised within the correlation request message is already registered at the correlation unit. Hence, in this exemplary embodiment, the media plane probe registers two (potential) media data paths of the service at the correlation unit simultaneously, one based on the destination IP address and port number and the other media data path based on the source IP address and port number.

In a further embodiment of the invention the correlation response message indicates the signaling session identifier of the signaling session associated with the media data path having the most reliable association, in case the media data path is associated to plural signaling sessions of services.

Moreover, it is foreseen in another embodiment of the invention that the correlation unit may also receive a session deregistration request message comprising a signaling session identifier, and de-registers all media data paths associated with the signaling session identifier comprised in the deregistration request message.

As already indicated above, another aspect of the invention is the provision of network elements (hosts) connected via a packet-switched network that allow performing the above outlined methods according to the different embodiments of the invention.

Accordingly, another embodiment of the invention is related to a signaling plane probe for use in a passive monitoring system of a packet-switched network. The signaling plane probe comprises a monitoring unit adapted to receive packets of a service on the packet-switched network. Further the signaling plane probe has a detection unit that is capable of detecting a signaling session of the service, e.g. by identifying one or more media data paths of a media plane of the service based on signaling information of the service comprised in the received packets. Moreover, the signaling plane probe can include a processing unit that generates a signaling session identifier for the signaling session of the service, and a transmitter unit adapted to transmit a session registration message from the to a correlation unit to register the signaling session of the service at a correlation unit. As explained above, the session registration message comprises the generated signaling session identifier of the signaling session and the one or more media data paths of the service identified by detection unit.

The signaling plane probe according a more advanced exemplary embodiment of the invention further comprises a database access unit to store the generated signaling session identifier in a database along with information on the signaling session of the service. The database may be either comprised by the signaling plane probe itself or may be remote to same, for example, accessible by means of the database access unit via the packet-switched network.

In a more advanced exemplary implementation the processing unit of the signaling probe may optionally generate a signaling session report on the signaling plane of the service. The session report comprises the signaling session identifier for identification of the signaling session and other service related information for storage in a session report database.

In another embodiment of the signaling plane probe, its detection unit may also detect another media data path of the media plane of the service based on signaling information of the service's signaling session monitored by the signaling probe after having registered the signaling session of the service at the correlation unit. The signaling plane probe's transmitting unit is further operable to transmit a registration message to the correlation unit to register the other media data path of the media plane of the service at the correlation unit. This registration message comprises the other media data path of the media plane of the service and the signaling session identifier of the signaling session of the service.

In a further embodiment of the invention, the processing unit of the signaling plane probe is adapted to generate a hash value based on the identified one or more media data paths of the media plane of the service, the hash value being used as the signaling session identifier.

The signaling plane probe according to another embodiment of the invention has the detection unit adapted to detect the signaling session of the service by examining signaling information of SIP signaling messages comprised in packets received by the signaling plane probe on the packet-switched network.

Furthermore, in another exemplary implementation of the signaling plane unit, the detection unit is capable of detecting the end of a signaling session of a service, and the transmitter unit of the signaling plane probe is enabled to transmit a session de-registration message to the correlation unit, the session de-registration message comprising the signaling session identifier of the service that has ended to thereby de-register all media data paths that are associated to the signaling session identifier of the service that has ended.

Another exemplary embodiment of the invention provides a correlation unit for use in a passive monitoring system of a packet-switched network. The correlation unit may comprise a receiving unit adapted to receive a session registration message comprising a signaling session identifier of a signaling session of a service and the one or more media data paths of the service from a signaling plane probe, and a registration management unit adapted to register the signaling session, by storing the signaling session identifier message, the one or more media data paths of the service, optionally, a reliability indication of the reliability of the association between the signaling session and the media data path comprised in the correlation request message in a database.

In another embodiment, the correlation unit's receiving unit is further adapted to receive a correlation request message from a media plane probe located in the packet-switched network, wherein the correlation request message indicates a media data path, and the correlation unit further comprises a processing unit adapted to determine whether a signaling session of a service is registered in the database for the media data path comprised within the correlation request message. The processing unit of the correlation unit is further adapted to generate a correlation response message comprising the determined signaling session identifier of the signaling session associated with the media data path comprised within the correlation request message. Moreover, the correlation unit has a transmitting unit adapted to transmit the correlation response message to the media plane probe.

The correlation unit according another embodiment of the invention has the receiving unit is further adapted to receive a deregistration request message comprising a signaling session identifier, and the registration management unit adapted to deregister all data paths associated with the signaling session identifier comprised in the deregistration request message.

In a further exemplary embodiment of the invention, the correlation request message received from the media plane probe comprises a destination IP address and port number and, optionally, a source IP address and port number comprised by packets conveying media plane data of a service, and the registration management unit is adapted to register a new media data path indicated by the source IP address and port number within the correlation request message for the signaling session of the service at the correlation unit, in case the source IP address and port number is comprises within the correlation request message and further in case the correlation unit has determined that the signaling session of the service for the media data path indicated by the destination IP address and port number comprised within the correlation request message is already registered at the correlation unit.

In another embodiment, the correlation unit's processing unit is adapted to determine whether a signaling session of a service is registered in the database for the media data path comprised within the correlation request message, by checking whether the media data path comprised within the correlation request message is stored in the database, and to obtain each signaling session identifier associated to the media data path comprised within the correlation request message stored in the database.

The correlation unit according to another embodiment of the invention has the processing unit adapted to include to the correlation response message the signaling session identifier of the signaling session associated with the media data path having the most reliable association, in case the media data path in the correlation request message is associated to plural signaling session identifiers in the database.

In another embodiment of the invention, the correlation request message may comprise multiple media data paths of media streams of one or more services. In this embodiment, the processing unit of the correlation unit determines for each media data path indicated in the correlation request message whether a respective signaling session of a service is registered in the database for the respective media data path comprised within the correlation request message. The correlation unit's processing unit further comprises a respective signaling session identifier of the respective signaling session associated with the respective media data path within the correlation request message to the correlation response message.

A further embodiment of the invention is providing a media plane probe for use in a passive monitoring system of a packet-switched network. The media plane probe may for example have a monitoring unit adapted to receive packets of a plural services on the packet-switched network and adapted to detect media data paths of media streams of the services from the received packets, and a processing unit to generate a correlation request message indicating a media data path of a service detected by the monitoring unit. The media plane probe may also comprise a transmitter unit adapted to transmit the correlation request message to a correlation unit, and a receiving unit adapted to receive a correlation response message from the correlation unit, wherein the correlation response message comprises a signaling session identifier of the signaling session associated with the media data path comprised within the correlation request message.

Please note that in one exemplary embodiment of the invention, the correlation unit and the media plane unit may be collocated in the same host (apparatus) in the network. For example, each media plane probe may further comprise the different structural and/or software modules that allow the media plane probe to also perform the functionality of the correlation unit as described in the different embodiments herein.

The media plane probe's processing unit may be for example also adapted to include to the correlation request message a destination IP address and port number and a source IP address and port number comprised by packets conveying media plane data of one of the services, and to associate a media data path indicated by the source IP address and port number and a media data path indicated by the destination IP address and port number to the signaling session identifier comprised in the correlation response message.

Another aspect of the invention is the implementation of the functionality of the media plane probe, the correlation unit and the signaling plane probe in software (software modules) that control a respective host device to perform the functions of a media plane probe, correlation unit and signaling plane probe, respectively. As mentioned above, optionally, a host devices may implement functionality of at least one of the media plane probe, correlation unit and signaling plane probe. Using software modules, this would mean that the host device stores and executes the respective software modules using a processor.

In this connection, another embodiment of the invention is related to a computer readable storage medium storing instructions that when executed by a processor of a host device, causes the host device to implement the functionality as a signaling plane probe by receiving packets of a service on a packet-switched network, detecting a signaling session of the service, by identifying one or more media data paths of a media plane of the service based on signaling information of the service comprised in the received packets, generating a signaling session identifier for the signaling session of the service, and transmitting a session registration message from the to a correlation unit to register the signaling session of the service at a correlation unit, wherein the session registration message comprises the generated signaling session identifier of the signaling session and the one or more media data paths of the service identified by detection unit.

Another exemplary embodiment of the invention relates to a computer readable storage medium storing instructions that when executed by a processor of a host device causes the host device to implement the functionality of a correlation unit by receiving a session registration message from a signaling plane probe, wherein the session registration message comprises a signaling session identifier of a signaling session of a service and the one or more media data paths of the service, and registering the signaling session, by storing the signaling session identifier message, the one or more media data paths of the service, optionally, a reliability indication of the reliability of the association between the signaling session and the media data path comprised in the correlation request message in a database.

In a further exemplary implementation according to another embodiment of the invention, this computer readable medium, further stores instructions that, when executed by the processor of the host device cause same to receive a correlation request message from a media plane probe located in the packet-switched network, wherein the correlation request message indicates a media data path, determine whether a signaling session of a service is registered in the database for the media data path comprised within the correlation request message, generate a correlation response message comprising the determined signaling session identifier of the signaling session associated with the media data path comprised within the correlation request message, and transmit the correlation response message to the media plane probe.

Moreover, another embodiment of the invention provides a computer readable storage medium storing instructions that when executed by a processor of a host device, cause the host device to implement the functionality of a media plane probe by receiving packets of a plural services on the packet-switched network, detecting media data paths of media streams of the services from the received packets, generating a correlation request message indicating a media data path of a service detected by the monitoring unit, transmitting the correlation request message to a correlation unit, and receiving a correlation response message from the correlation unit, wherein the correlation response message comprises a signaling session identifier of the signaling session associated with the media data path comprised within the correlation request message.

Please note that the respective computer readable media may optionally further store instructions that cause the host device to implement the functionality of at least one of a signaling plane probe, media plane probe and correlation unit according to one of the different embodiments of the invention described herein.

BRIEF DESCRIPTION OF THE FIGURES

In the following the invention is described in more detail in reference to the attached figures and drawings. Similar or corresponding details in the figures are marked with the same reference numerals.

FIG. 9 shows a flow chart of the operation of the correlation unit according to an exemplary embodiment of the invention, FIG. 11 shows a flow chart of the operation of a media plane probe according to an embodiment of the invention

FIGS. 14 & 15 show two exemplary embodiments of signaling session registration messages according to respective embodiments of the invention, FIG. 16 shows a signaling session deregistration message according to an exemplary embodiment of the invention, FIGS. 17 & 18 show two exemplary embodiments of correlation request messages according to respective embodiments of the invention, FIGS. 19 & 20 show two exemplary embodiments of correlation response messages according to respective embodiments of the invention.

DETAILED DESCRIPTION OF THE INVENTION

Figure 1:
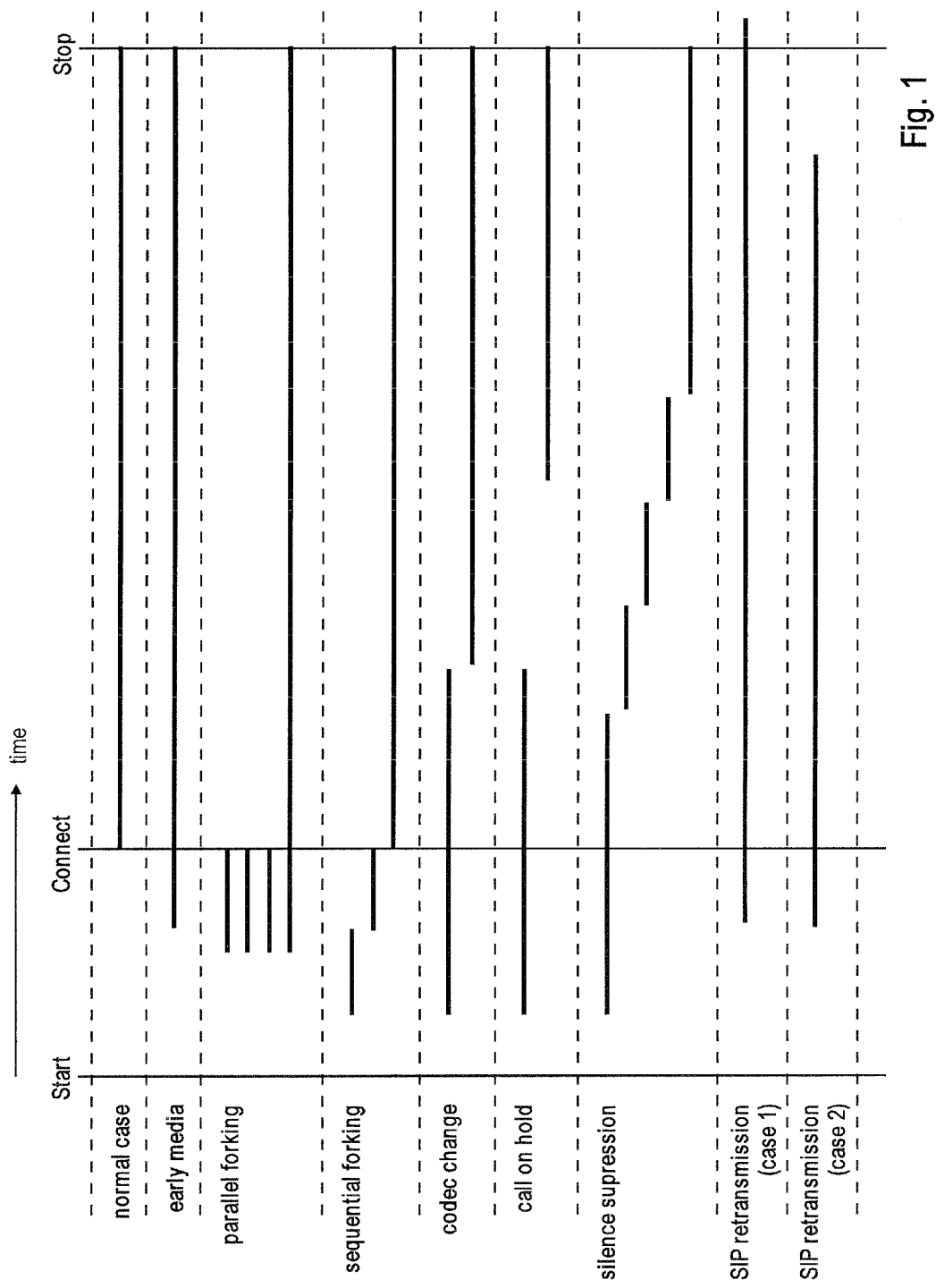
FIG. 1 shows exemplary situations where multiple media streams may be triggered in a media service.
Figure 2:
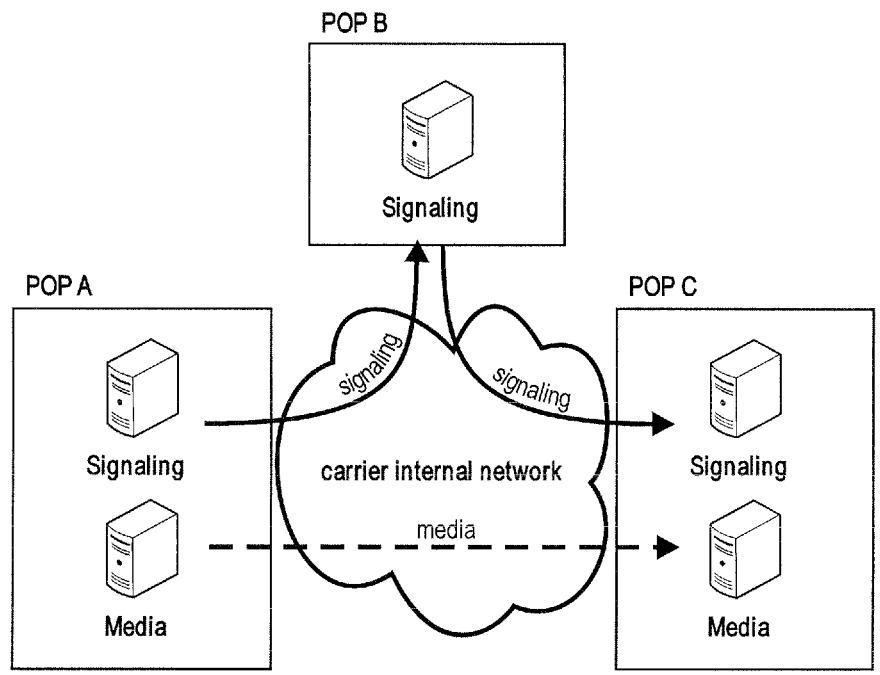
FIG. 2 shows three geographically distributed POPs (Point of Presence) which are linked over the carrier's internal network.
Figure 3:
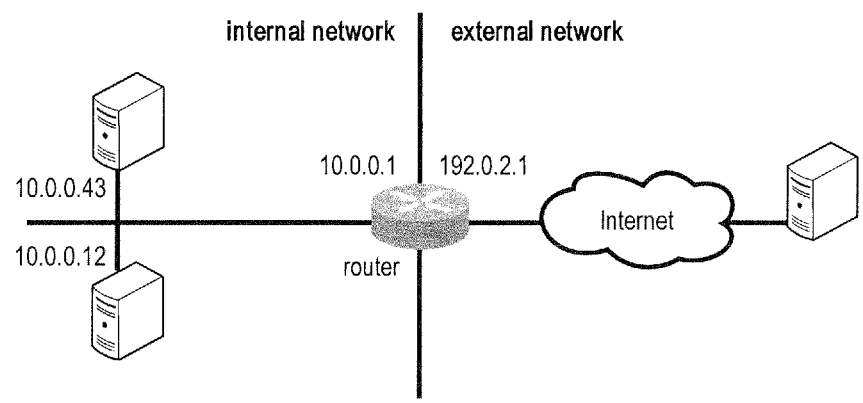
FIG. 3 shows an exemplary network using internal and external addresses.

The following paragraphs will describe various embodiments of the invention. For exemplary purposes only, most of the embodiments are outlined in relation mainly to VoIP services as an example for a media service, but the invention is not limited to VoIP services. For example, the invention may also be used for other types of media services provided in packet-switched networks. The invention may be advantageously used in media services which have signaling plane and media plane separated and/or taking different routes through the packet-switched network.

The explanations given in the Technical Background section above are intended to better understand the mostly VoIP specific exemplary embodiments described herein and should not be understood as limiting the invention to the described specific implementations of processes and functions in a packet-switched communication network.

As indicated above, the invention generally relates to methods for correlating at least one media data path and a signaling session of a service in a passive monitoring system of a packet-switched network. Furthermore, the invention also relates to on implementation of these methods in hardware and software, and provides a signaling plane probe, a media plane probe and a correlation unit. Based on the assumption of disjunctive signaling and media components of a service, the correlation mechanism suggested herein supports correlation across multiple hosts connected via a network (e.g. a Local Area Network (LAN), Wide Area Network (WAN) or the Internet).

In this connection, one of the aspects of this invention is the definition and use of a key, which can be used for correlation of media streams and signaling sessions. This key is called "signaling session identifier" herein. The key is identifying a signaling session and as it can be assumed that a single media service, e.g. a VoIP service, has one signaling session, the key may be thus also considered to identify the VoIP service.

The correlation method proposed according to one aspect of the invention is based on a probe monitoring the signaling plane traffic of services (i.e. a signaling plane probe) identifying new services and associated media data paths of the media plane by detecting their corresponding signaling sessions and determining for each service a signaling session identifier for each signaling session of a given service.

The signaling plane probe registers the signaling sessions and their media data paths at a correlation unit in the network using the signaling session identifiers as a key. A probe monitoring the media plane traffic of services (i.e. a media plane probe) can query the correlation unit for respective signaling session identifiers that correspond to media data paths detected in the media plane traffic monitored by the media plane probe thereby establishing the correlation between given media paths and signaling sessions of the services. A media data path may be for example indicated by a destination IP address and port number comprised by packets conveying media plane data of a service, if transport layer and network layer information is used to identify the media data path.

Figure 4:
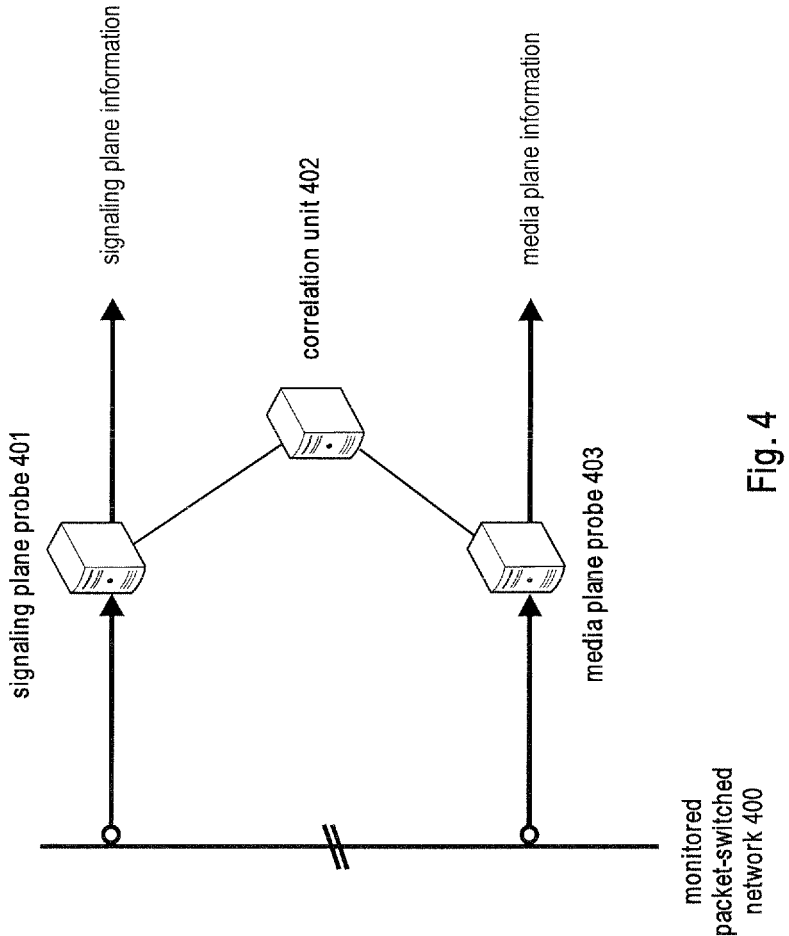
FIG. 4 shows a packet-switched network according to an exemplary embodiment of the invention, the packet-switched network comprising a signaling plane probe and a media plane probe.

FIG. 4 shows a packet switched network 400 according to an exemplary embodiment of the invention that comprises a signaling plane probe 401, a correlation unit 402 and a media plane probe 403. Please note that more than one signaling plane probe 401 and media plane probe 403 may be provided, while there may be only one correlation unit 402. In another implementation, the correlation unit 402 and the media plane probe 403 may be co-located in which case there will be multiple co-located correlation units 402 and the media plane probes 403.

The signaling monitoring probe 401 and the media plane probe 402 are monitoring the traffic on a packet-switched network 404, which may be for example an IP based packet switched network. It is assumed or exemplary purposes that the signaling plane probe 401 and the media plane probe 403 monitor the traffic of the packet-switched network 404 at different locations of the packet-switched network 404.

In one exemplary implementation, the signaling plane probe 401 and the media plane probe 403 are probes of a minimal non-intrusive, passive monitoring system. The respective monitoring probes 401, 403 are connected to the packet-switched network 404 via respective test access ports (TAPs). A TAP is a passive network device that mirrors network traffic of the packet-switched network without interference of the original network traffic. It provides a copy of every packet sent or received on the network, by duplicating the data packets observed on the physical layer of the network.

In packet-switched environments such as for example shown in FIG. 4, the signaling data of the signaling plane and media data of the media plane is packaged into packets on the transmitter side. Packets are transported over the packet-switched network independent of each other. The receiver of the packets—identified by the IP address and port—has to regroup and sometimes reorder packets in order to compile streams from single packets.

On the signaling plane multiple packets belong to one signaling session. The first packet of a signaling session—usually containing a 'call setup' message—starts a new signaling session (respectively a new service). At this point, the signaling plane probe 401 generates a session entry along with auxiliary data, i.e. a unique key identifying the session internally (signaling session identifier). Packets following the initial signaling packet are matched to one of the currently ongoing signaling sessions (respectively services) and signaling sessions managed by the signaling plane probe. Packets which do not start a new signaling session on for them themselves and do not belong to existing sessions may be discarded. Matching single signaling packets to existing signaling sessions is specified in the standards which define the signaling protocol itself. Transport layer information like IP addresses and protocol-specific information (e.g. SIP Call-IDs and tags) may be used. A signaling session may be torn down upon reception of a special packet—a 'call hang-up' message. This message again is specific to the signaling protocol used. Upon reception of this message the signaling plane probe 401 can remove the signaling session from its internal storage. Additionally the signaling monitoring component may remove sessions from its internal storage if it identifies stale sessions.

The media plane of the service may for example carry the media plane data in form of RTP streams. RTP streams are—analog to the signaling sessions—made up from individual RTP packets. The transmitter of an RTP stream generates RIP packets by splitting the media data into smaller pieces. In general these packets are relatively small to reduce the delay between sender and receiver. As a result many packets are created and form a single RTP stream—typically 50 packets per second. Single RTP packets can be grouped into an RTP stream by media plane probe 403. When using RTP, the media plane probe 403 has transport layer information as well as the RTP protocol header which contains a so called Synchronization source (SSRC). The SSRC is a 32-bit numeric identifier which is contained in every single packet and deemed mandatory by the RTP. When media plane probe 403 first receives a packet which does not match an existing RTP stream in its internal storage it creates an RTP stream. Consecutive RTP packets can then be matched to the existing streams by comparing the transport layer information and SSRC value. If no packets are received for a single RTP stream for a certain time the stream is considered ended and can be removed from the internal storage. A short interruption in the packet stream should not trigger the media plane probe 403 to mark a RTP stream as ended, thus the time before a media plane probe 403 can consider a RTP stream as ended is multiple seconds and has to take features like voice activity detection into account.

Figure 5:
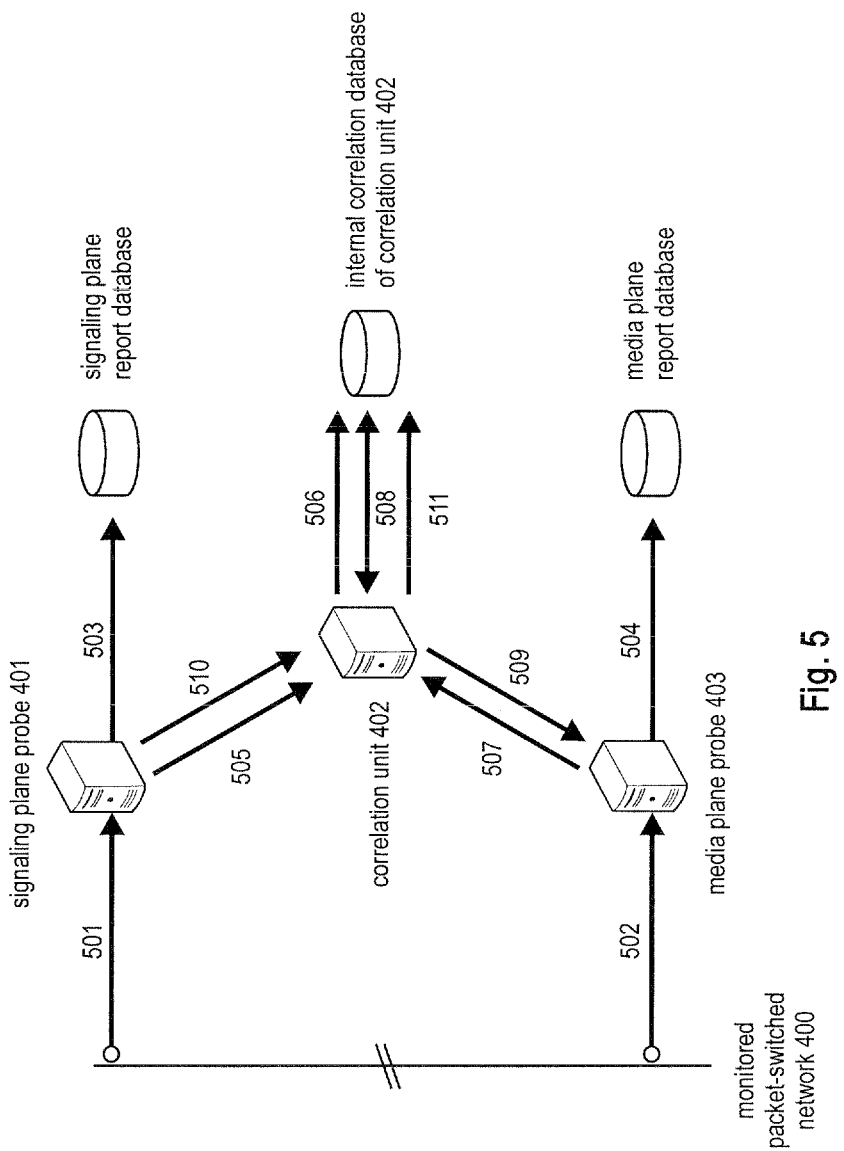
FIG. 5 shows an exemplary overview on correlation related messaging of a signaling plane probe, a correlation unit and a media plane probe in a packet-switched network according to an exemplary embodiment of the invention.

FIG. 5 shows an exemplary overview on the correlation related messages exchanged and operations performed by the different components of the packet-switched network as exemplarily shown in FIG. 4 and according to an exemplary embodiment of the invention. As mentioned above, the signaling plane probe 401 can identify new media services, such as VoIP services, based on the signaling packets/messages (i.e. SIP) which are monitored 501 by the signaling plane probe 401. For every new media service, respectively signaling session, the media plane probe 403 creates a new data structure which is referenced to by a unique hash value named signaling session identifier. The properties of the signaling session identifier are such that it is guaranteed to be unique for a certain amount of time and such that it allows for a lookup of the signaling session related data solely based on the hash value itself.

The signaling plane probe 401 forwards 505 a 'new session' event to the correlation unit 402 using a registration message (e.g. the CORR_MSG_XDRINFO message discussed below). The event contains the signaling session identifier along with media plane information. The media information contains for example possible media path(s) on which media plane data of the service may flow. A media path may be for example identified by the IP address and port tuples identified in the signaling session. The signaling plane probe 401 advantageously determines the signaling session identifier and transmits it along with the media information, eliminating the need for a reverse communication channel from the correlation unit 402 to the signaling plane probe 401.

The correlation unit 402 stores 506 the received information in an internal database for future reference.

The media plane probe 403 identifies a new media stream of a media service based on the network traffic it observes 502 as outlined above. The identification of a new media stream for a give service may happen shortly after this service is set up on the signaling plane. New media streams detected by the media plane probe 403 are reported to the correlation unit 402 to link them to a corresponding media service, respectively signaling session. For this purpose, the media plane probe 403 sends 507 a correlation request message (e.g. the CORR_MSG_REQUEST message discussed below) to the correlation unit 402. The correlation request message contains for example transport layer destination IP address and port number of the detected media stream and optionally a new stream hash value or a sequence number of the correlation request message in order to facilitate linking the response of the correlation unit 402 to the request. When using a stream hash value same should uniquely identify the media stream. The properties of the stream hash value are similar to the signaling session identifier properties in terms of uniqueness for a certain time. Moreover, the correlation request message may optionally comprise the source IP address and port number of the media path.

The correlation request messages are processed by the correlation unit 402 by looking up 508 the given IP address and port tuple in the correlation unit's database. In case the (destination) IP address and port tuple indicated in the correlation request message can be matched to a corresponding media path entry registered in the database, the matching database entry yields a signaling session identifier of the corresponding media service. This signaling session identifier links the media stream of the correlation request message to the specific media service which triggered the media stream. In order to inform the media plane probe 403 on the media service to which the media path belongs, respectively the corresponding signaling session, the correlation unit 402 sends 509 the signaling session identifier value back to the media plane probe as a correlation response message (e.g. a CORR_MSG_RESPONSE message as discussed below). Please note that a correlation request message may also include more than one media path, which causes the correlation unit to query its database for each indicated media data path and may indicate the according signaling session identifiers to the correlation response message.

The media plane probe 403 enriches the local information on the media stream with the signaling session identifier based on the correlation response message. Internally the media plane probe 403 may look-up a given media stream for a specific correlation response message based on the stream hash value, which may also be comprised to the correlation response message. The time between the correlation request message and the correlation response message may be undefined. Instead of using the stream hash value as key to match correlation request message with the appropriate correlation response messages any other unique identifier—i.e. a sequence number—could be used. The mechanism allows the correlation unit 502 to respond to a correlation requests at any given time while the media stream is running and still visible to the media plane probe 403.

Independent of other involved components, the signaling plane probe 401 may perform additional tasks upon detecting termination of a media service. For example, the signaling plane probe 401 could write 503 an a summary of the signaling session (signaling session details report) which outlines the media service (e.g. identification of the caller and callee, time stamps, etc.) along with the signaling session identifier value to a database. Additionally, the signaling plane probe 401 could inform the correlation unit 402 that the given media service ended by deregistering 510 the signaling session. This allows the correlation unit 402 to remove 511 old entries for signaling sessions that match the signaling session identifier of the signaling session contained in the deregistration message from its internal database.

As outlined, the signaling plane probe 401 and the media plane probe 403 both generate information about the signaling sessions or media streams, respectively. In order to track running signaling sessions and media streams, the signaling plane probe 401 and the media plane probe 403 store information internally while the signaling sessions and media streams are not terminated. The correlation process may start as soon as the first packet which started the signaling session or media stream was received. The start of a new signaling session (respectively media service) or media stream (of the media service) may be considered the start event of the correlation mechanism. The signaling plane probe 401 and the media plane probe 403 trigger the correlation unit once they internally created a new signaling session/media stream.

To prevent the correlation information from staying in memory on the signaling plane probe 401 and the media plane probe 403 too long, the correlation should be finished by the time the signaling session or media stream ends. This allows signaling plane probe 401 and media plane probe 403, respectively, to write data records summarizing the signaling session and media streams, respectively. Each data record on a signaling session may contain a variable amount of data describing the signaling session. For example, for a VoIP service, a data record on the signaling session may include a caller and callee (each identified by a SIP URI and/or IP addresses), information about their client software and/or hardware (i.e. User-Agent name/version, features supported, media types supported, device type) as well as the possible communication paths. Protocol-specific information like SIP Call-IDs, branch tags, route sets or arbitrary header values can be appended depending on the application needs.

The media plane probe 403 may write 504 fine-grained quality data records or more general call data records with media plane related information. Media plane properties include quality information like MOS values (e.g. minimum/average/maximum MOS), codec used, packet loss, inter arrival time (jitter) and impairment information of a respective monitored media stream or media streams belonging to a media session. Like the data records for the signaling session, the specific content of the records written by the media plane probe 403 may depend on the application as well as capabilities of the media plane probe 403 itself.

Signaling Plane Probe

Figure 6:
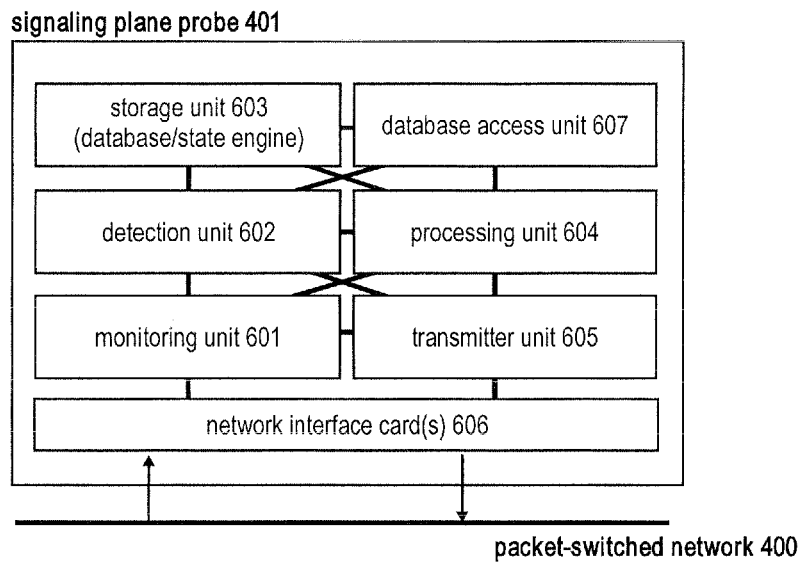
FIG. 6 shows the structure of a signaling plane probe according to an embodiment of the invention.
Figure 7:
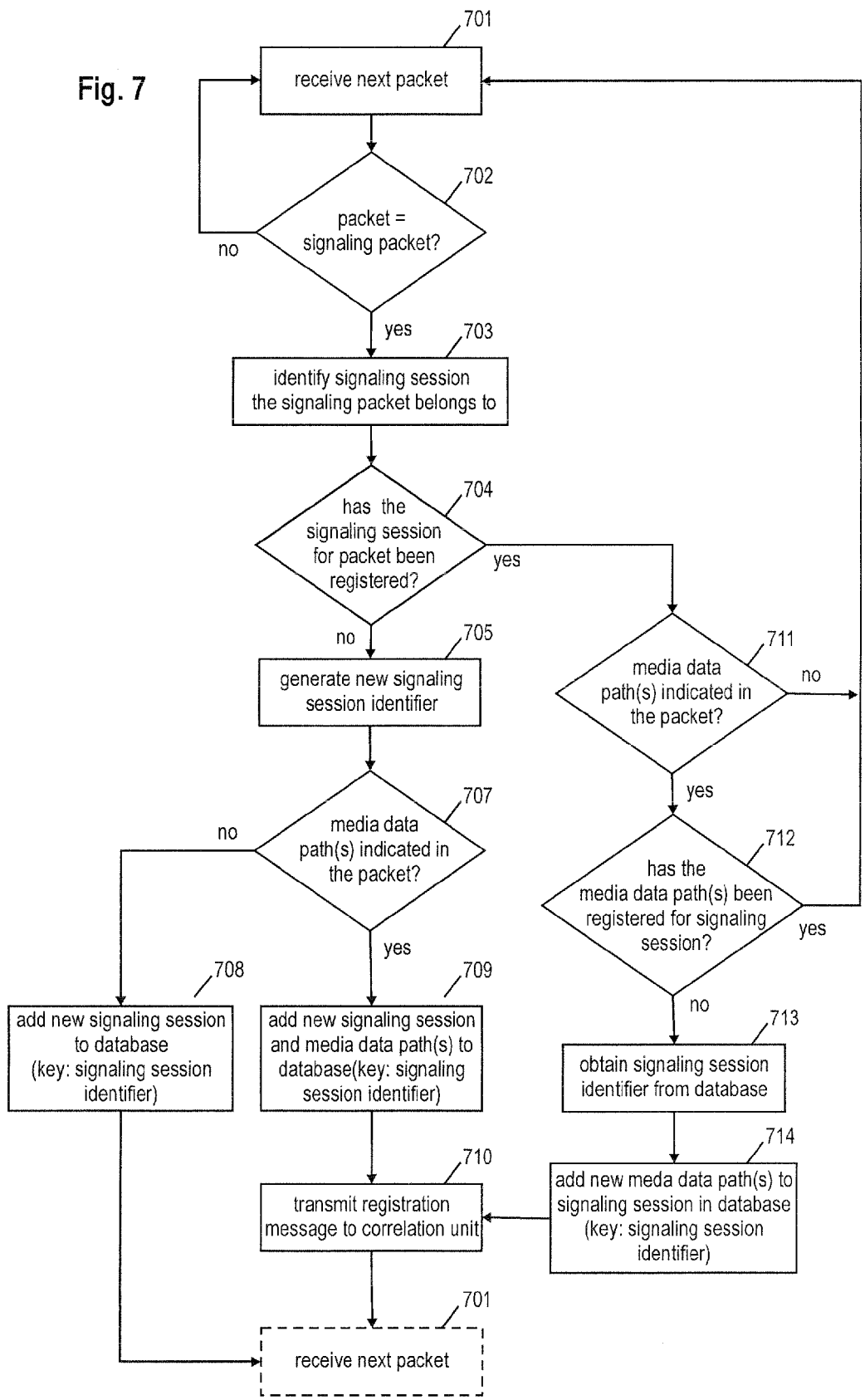
FIG. 7 shows an exemplary flow chart of the operation of a signaling plane probe according to an exemplary embodiment of the invention.

FIG. 6 shows an exemplary implementation of a signaling plane probe 401 and FIG. 7 shows an exemplary flow chart of the operation of same according to an exemplary embodiment of the invention. In general, the signaling plane probe 401 observes one or more network links to obtain a copy of all packets passing these network links/interfaces. For this purpose, the signaling plane probe 401 comprises a monitoring unit 601 that receives 701 packets of a service on the packet-switched network 400. For example, this monitoring unit 601 may receive the packets from a one or more specialized packet capture cards 606 (network interface card—NIC) which is capable of receiving and processing packets on the physical interface and to provide them to the application layer, nearly without requiring CPU processing time and operation system functionality. An optional filter in each packet capture card of the signaling plane probe 401 may be used to prevent unwanted packets from being copied from the network interfaces to the processing processes. These filters may be for example implemented as stateless or stateful Internet Protocol (IP) or payload filters. For example, this filter may check 702, whether the currently processed packet is a signaling packet or not. If the packet does not belong to a signaling session, i.e. is not packet of a signaling related protocol, the next packet may be processed.

Each signaling packet received at the signaling plane probe 401 will be processed by a detection unit 602 which analyzes the contents of the packets provided by the monitoring unit 601 so as to identify and process packets as signaling packets. Specifically, the detection unit 602 detects signaling packets and matches these to signaling sessions of the media service, and is capable of identifying one or more media data paths of a media plane of the service based on signaling information of the service comprised in the received packets. Please note that the detection unit 602 may be provided in one or more specialized packet capture card.

For example, the detection unit 602 packets containing signaling information (signaling packets) are identified in a parsing process based on their header information. If parsed successfully as a signaling packet, the signaling packet is forwarded to a state engine. The state engine is designed to identify 703 and form signaling sessions from individual signaling packets.

The state engine (which may be considered an internal database with correlation related information maintained in the storage unit 603) of the detection unit 602 has a processing facility and a state table which holds information about signaling sessions. Based on the protocol-specific identifiers in the signaling packets in the packet headers the detection unit 602 can identify the start of a new signaling session or append a respective processed signaling packet to an existing signaling session. Signaling packets which neither start a new session nor belong to an existing session may be discarded. Depending on whether the identified signaling session is already registered in the signaling plane probe 401 (step 704), the detection unit 602 may need to generate 705 a new signaling session identifier. The signaling plane probe 401 comprises a processing unit 604 that generates 705 a signaling session identifier in response to detection 704 of a new signaling session in the detection unit 602. The signaling session identifier may be for example a hash value. The state table may use the signaling session identifier value as unique key to identify a specific signaling session.

Furthermore, by analyzing 707, 711 the contents of the signaling packets, e.g. a SDP body of a SIP messages comprised in signaling packets, the detection unit 602 may further learn one or more media data paths of the media plane of the service belonging to the media service that is associated to a given signaling session. The signaling plane probe 401 may further comprise a storage unit 603, e.g. a volatile memory, to store the information describing the state of the respective signaling sessions in the state table (see steps 708, 709, 714). Please note that in case a processed signaling packet starts a new session (step 704: no) but does not contain a media data path of the new signaling session (step 707: no), the detection unit 602 may add 708 the signaling session only to the local signaling plane probe internal database (in storage unit 603), while in case there is also a media data path included in the packet starting the signaling session, the detection unit 602 may add 709 the signaling session and its the media data path to the local signaling plane probe internal database and sends 710 the registration message to the correlation unit.

The registration message comprises the signaling session identifier of the signaling session as well as one of more media data paths of the media plane of the media service that has/have been detected by the detection unit 602. A transmitter unit 605 transmits the session registration message to the correlation unit 402 to register the signaling session of the service at a correlation unit. In one exemplary implementation this registration message is a CORR_MSG_XDRINFO message as will be outlined below in further detail. Please note that in case the probes should perform passive non-intrusive monitoring of the signaling plane traffic, respectively media plane traffic, a separate network interface card is needed for the transmission of correlation related messages (i.e. the network interface card/s) for monitoring the traffic are only employed for packet reception but not for packet transmission).

Once a given signaling packet has been processed, it may be discarded.

With respect to steps 707 and 708 as shown in FIG. 7, it should be noted that same are optional. For example, in signaling protocol like SIP, the signaling packet that is starting a signaling session typically comprises also one or more media data paths. Hence, in this case its would not be necessary to check, whether the signaling packet starring a new signaling session contains a media data path, but the flow may also directly proceed from step 705 to step 709.

A received signaling packet may also update an existing signaling session in the state table e.g. by adding one or more new media paths of the media plane of a media service associated to the signaling session (step 704: yes, step 711: yes and step 712: yes). The detection unit 602 may thus obtain 713 the signaling session identifier of the signaling session to be updated and add 714 the new media data path(s) to its local signaling session database. Furthermore, the signaling plane probe 401 updates 715 the registration at the correlation unit 402 by sending—using the transmitter unit 605—another registration message to the correlation unit 402 which comprises the signaling session identifier of the given signaling session, respectively media service and the new media path(s) of the service's media plane. In one exemplary implementation this registration message is a CORR_MSG_XDRINFO message as will be outlined below in further detail.

Likewise (not shown in FIG. 7), if a received signaling packet terminates an existing signaling session the signaling plane probe 401 requests the correlation unit 402 to remove the registration of the signaling session by a deregistration message which indicates the signaling session identifier of the signaling session to be deregistered. For example, the deregistration message may be implemented as a CORR_MSG_XDREOC message and is outlined below.

Optionally (not shown in FIG. 7), in another exemplary embodiment, the detection unit 602 of the signaling plane probe 401 periodically (e.g. every 5 seconds) traverses all entries in the state table in order to find and clean up stale signaling sessions. For this purpose, the signaling plane probe 401 may add a timestamp to each signaling session entry in the state table that is updated each time a new signaling packet/message of the respective signaling session is received. Based on this timestamp allows to identify stale signaling session by simply checking based on the signaling sessions timestamps whether the last signaling packet/message for a given signaling session has been received longer than a threshold time period ago. For example, stale sessions might be those which did not receive new signaling packets/messages for 86400 seconds or signaling sessions may be defined stale and are terminated after a certain time. This clean-up removes unnecessary information from the state table and informs the correlation unit 402 to delete the same entry from its database by sending deregistration message as outlined above.

Furthermore, upon termination of a signaling session the signaling plane probe 401 may create a database entry composed of information describing the entire signaling session (not shown in FIG. 7). The information record stored in the database may for example comprise the signaling session identifier of the terminated signaling session, time-stamps of start- and end-time of the signaling session and information about all endpoints (e.g. IP address and port tuples) involved in the media service. For this purpose, signaling plane probe 401 could include a database access unit 607 which stores the signaling session identifier in a database along with information record on the signaling session of the service. The database may be internal to the signaling plane probe 401 or may be an external database, e.g. accessible by means of the database access unit 607 via the packet-switched network.

Correlation Unit

Figure 8:
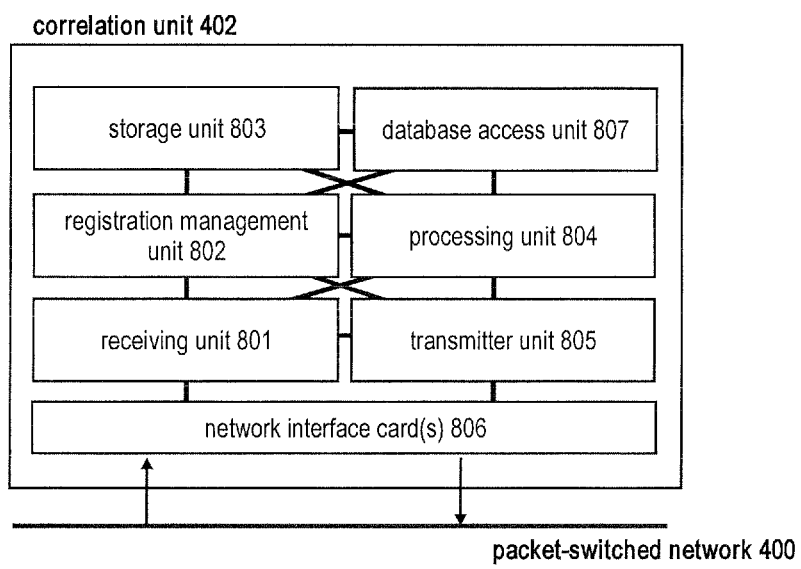
FIG. 8 shows the structure of a correlation unit according to an exemplary embodiment of the invention.

Next, the correlation unit 402 as shown in FIG. 4 is discussed in further detail with respect to FIG. 8 and FIG. 9. FIG. 8 shows the structure of a correlation unit 402 according to an exemplary embodiment of the invention. The correlation unit 402 is reachable via the packet-switched network. For this purpose, the correlation unit 402 may comprise one or more network interface cards 806. The correlation unit 402 has a receiving unit 801 for receiving various correlation related messages, such as for registration, update and termination of signaling session as well as media stream correlation requests. The receiving unit 801 may receive the correlation related messages from its network interface card(s) 806. The receiving unit 801 may for example receive a session registration message from a signaling plane probe 401 for registering a new signaling session and at least one associated media data path or for updating the media data paths(s) registered for a given signaling session.

To manage the registrations, the correlation unit 402 comprises a registration management unit 802. The registration management unit 802 is responsible for storing a record for each signaling session that is indicating e.g. the signaling session identifier of the given signaling session, one or more media data paths of the signaling session, and optionally, a reliability indication of the reliability of the association between the signaling session and the media data path comprised in the correlation request message in a correlation database. Since it may happen that the same data path is indicated to be associated for two different signaling sessions, the reliability indication may be used by the correlation unit 402 to determine to which signaling session the given data path should be mapped. The record for each signaling session may be for example stored in a correlation database contained in a local storage 803.

Furthermore, the registration management unit 802 may further generate for each media data path of the signaling session a respective timestamp that is stored along with the media path information in the record for the signaling session. The timestamp is identifying the point in time of registering a given media data path at the correlation unit 402. This timestamp may be used to implement an "aging" of the media path entries, which may be for example considered in the resolution of a signaling session identifier for a given media data path or for clean up processes of the correlation unit 402, as will be outlined below in further detail.

The correlation unit 402 may also have a processing unit 804. The processing unit 804 maybe used to determine whether a signaling session of a service is registered in the correlation database for a given media data path. Furthermore, the processing unit 804 may be used to generate a correlation response message to correlation requests that indicate a signaling session identifier of the signaling session associated with the given media data path comprised within the correlation request message.

The correlation unit 402 may also be equipped with a transmitting unit 805 to transmit the messages on the packet-switched network via a network interface card 806 (or internally in a device if the correlation unit 402 and the media plane probe 403 are implemented in the same device), e.g. to transmit a correlation response message (CORR_MSG_RESPONSE message type as described below) to the media plane probe 403.

In one exemplary embodiment, the correlation unit 402 may receive a correlation request message from a media plane probe 403 that comprises a destination IP address and port number and, optionally, a source IP address and port number comprised by packets conveying media plane data of a service. The registration management unit 802 registers a new media data path indicated by the source IP address and port number within the correlation request message for the service at the correlation unit 402, in case the source IP address and port number is comprises within the correlation request message and further in case the correlation unit has determined that the signaling session of the service for the media data path indicated by the destination IP address and port number comprised within the correlation request message is already registered at the correlation unit.

The correlation unit 402 may use the processing unit 804 to search for registered signaling sessions corresponding to a given media data path using the media data path as a key to the correlation database storing the records of the different registered signaling sessions. The processing unit 804 obtains each signaling session identifier associated to the media data path comprised within the correlation request message stored in the correlation database, e.g. using a database access unit 807. The transmitting unit 805 of the correlation unit 402 is used to transmit a correlation response message to the querying media plane probe 403. As indicated above, if there are several signaling sessions associated to a given media data path, the processing unit 803 may include the signaling session identifier of the signaling session associated with the media data path having the most reliable association to the correlation response message. Optionally, the correlation response message may also indicate a ranked list of signaling session identifiers that are associated to the given media data path.

In a further embodiment of the invention, there is a timestamp provided for each media data path entry in the correlation database 603 of the correlation unit 402. Furthermore, it may be assumed that the reliability of the respective media data paths is indicated by respective reliability indices having only a given granularity (e.g. four different levels of reliability can be distinguished). In case a media data path indicated in a correlation request message is matching multiple signaling session identifiers in the correlation database of the correlation unit 402 and further the respective matching media data paths entries for the different signaling sessions that have the same highest reliability (index), the processing unit 804 selects the signaling session identifier of the signaling session record, the media data path entry of which has the most current timestamp and includes this signaling session identifier in the correlation response message. Hence, in case multiple signaling sessions are matched to the queried media data path, the signaling session identifier of the signaling session is returned for which the matching media data path entry has been updated last.

Please note that in the procedures descried above the registration management unit 802 and the processing unit 804 may use the database access unit 807 to access the correlation database in the storage unit 803.

FIG. 9 shows a flow chart of the operation of the correlation unit 402 according to an exemplary embodiment of the invention. The correlation unit 402 receives 901 correlation related messages from the signaling plane probe 401 and the media plane probe 403 using its receiving unit 801 and acts 902 upon these messages according to the message type.

For example, in case the message received is a registration message received from a signaling plane probe 401, the registration message contains one or more new potential media paths ('candidates') and the signaling session identifier value to be used for these candidates. In case the signaling session indicated by the signaling session identifier is not yet registered (step 903: no), the registration management unit 802 may create and store 904 a new signaling session record for the signaling session that is comprising the signaling session identifier of the given signaling session, one or more media data paths of the signaling session, and optionally, a reliability indication of the reliability of the association between the signaling session and the media data path comprised in the correlation request message in a database. Otherwise (step 903: yes), the signaling session record kept by the correlation unit 402 is updated 905 to account for the new data path(s) indicated in the registration message. The registration message is discarded and does not need to be responded to by the correlation unit 402.

The signaling session records may be for example kept in a state table that indicates the media paths and corresponding signaling session identifiers. For each candidate inside a single registration message the correlation unit 402 appends an entry to its state table. The key used to organize the entries in the state table is the media path, e.g. the destination IP address and IP address of the media path. The value stored for the key in the state table is the signaling session identifier value and optionally reliability information to indicate the reliability of the association.

Upon reception of a deregistration message from a signaling plane probe 401, the correlation unit 402 (in more detail the registration management unit 802) deletes 906 all entries in the state table which are identified by the signaling session identifier indicated in the deregistration message is contained. Again, the deregistration message itself may be subsequently discarded and no response thereto needs to be send to the signaling plane probe 401.

Furthermore, the correlation related message received at the correlation unit 402 may also be a correlation request message received from a media plane probe 403. The request contains a media path (or optionally multiple media paths) indicated for example by means of a destination IP address and port tuple, which is compared 907 to the candidates (media paths) maintained by the correlation unit 402 in its state table to identify matching entries. If multiple entries in the state table match a single media path, the correlation unit 402 may for example use the entry from the state table which has the highest reliability or may alternatively use all entries that match the queried data path.

The correlation unit 402 employs its transmitting unit 807 for returning 908 a correlation response message to the media plane probe 403 which sent the correlation request message. The response for example contains the signaling session identifier of the signaling session found in the state table, as outlined above. Additionally the correlation unit 402 may include a media path identifier (e.g. stream hash value) identifying the queried media data path to the correlation response message. The media path identifier (e.g. stream hash value) may be part of the correlation request message and may be used by the media plane probe 403 to associate the correlation response message to a correlation request message. The media path identifier (e.g. stream hash value) is not modified or used in the correlation unit 402 but passed back to the media plane probe 403 as part of the protocol.

If the correlation unit 402 does not immediately find a matching signaling session identifier for a data path indicated in a correlation request message, it adds the correlation request message to an 'outstanding request' list without sending a correlation response message to the media plane probe 403. This list is periodically (e.g. every 10 seconds) processed, i.e. the correlation unit 402 processes all correlation request messages in this list according to the procedure shown in FIG. 9: For each entry in the list the correlation unit 402 re-attempts to find a correlated signaling session identifier by comparing the media path entries against the candidates in the correlation unit's state table. If the correlation was successful a correlation response message is dispatched to the media plane probe 403 as described above and the according entry in the 'outstanding request' list is removed. If they correlation did not yield any result the entry will remain in the list until it expires. Expiration of an outstanding request happens after a configurable amount of time, e.g. 300 seconds.

Furthermore, in another embodiment of the invention, there may also be a media path deregistration implemented. A signaling plane probe 401 may detect a media data path being terminated (e.g. due to an ended signaling session) and may indicate this event to the correlation unit 402. For this purpose, the signaling plane probe 401 transmits a media data path deregistration message to the correlation unit 402 which indicates the media data path to be deregistered and a signaling session identifier of the signaling session for which the media data path is to be deregistered. Additional media data paths which may have been registered previously with the same signaling session identifier are not affected of this update. The registration management unit 802 of the correlation unit 402 removes the respective media data path entry of the given signaling session in its correlation database.

Media Plane Probe

Figure 10:
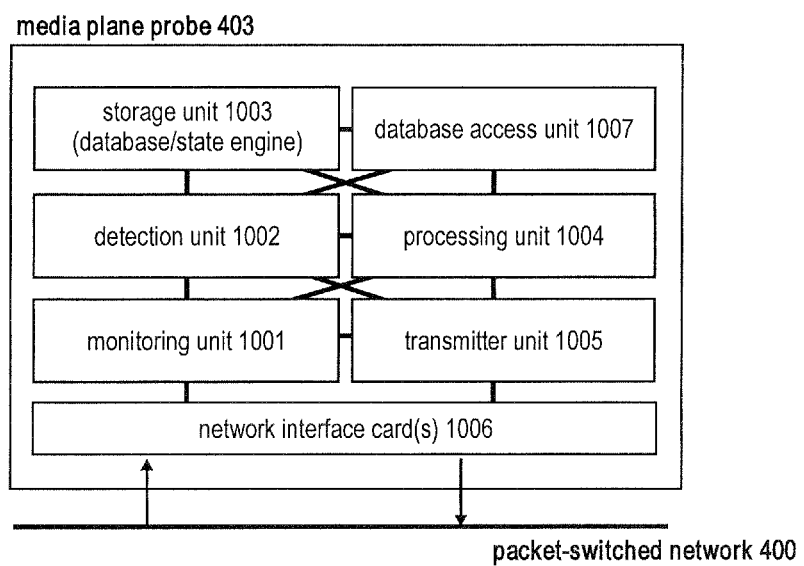
FIG. 10 shows the structure of a media plane probe according to an embodiment of the invention.

Next, the media plane probe 403 according to an exemplary embodiment of the invention is described with respect to FIG. 10 and FIG. 11 below. FIG. 10 shows an exemplary embodiment of a media plane probe 403, while FIG. 11 shows a flow chart of its exemplar operation according to an embodiment of the invention.

Similar to the signaling plane probe 401, the media plane probe 403 observes one or more network links to obtain a copy of all packets passing these interfaces. The media plane probe 403 may observe one or more network links to obtain a copy of all packets passing these interfaces. The media plane probe 403 comprises a monitoring unit 1001 that receives 1101 packets of a service on the packet-switched network 401. For example, this monitoring unit 1001 received the packets from one or more specialized packet capture cards 1006 (network interface card—NIC) which are capable of receiving and processing packets on the physical interface and to provide them to the application layer, nearly without requiring CPU processing time and operation system functionality. An optional filter in the packet capture card of the media plane probe 403 may be used to prevent unwanted packets from being copied from the network interfaces to the processing processes. This filter may be for example implemented as stateless or stateful Internet Protocol (IP) or payload filter. For example, this filter may check 1102, whether the currently processed packet is a media plane packet (media packet), comprises a correlation response message or is some other packet. If the packet does not belong to the media plane, i.e. is not packet of a media related protocol, such as for example RTP, and is also not comprising a correlation response message, the next packet may be processed.

Each media packet received will be processed by the media plane probe 403. The detection unit 1002 of the media plane probe 403 is designed to detect and form 1103 media streams from single media packets. The media plane probe 403 may further comprise a processing unit 1002 that may hold a state table which stores information about media streams monitored by the media plane probe 403 in a local storage unit 1003, e.g. a volatile memory. Based on the protocol-specific identifiers in the media streams the media plane probe 403 (e.g. based on header information in the RTP packets and/or lower layer headers) the detection unit 1002 identifies a received packet as the start of a new media stream (having a given media data path) or append the new packet to an existing media stream (i.e. media data path). The media streams or better the media paths thereof are for example indicated by an IP address and port tuple of the destination device, i.e. the receiving device of the media stream. The media plane probe's detection unit 1004 stores information describing the state of the detected media streams in the state table. Optionally, the individual media streams (i.e. their media data paths) may be identified by a media path identifier (e.g. stream hash value) as unique key. Upon detecting a new media stream, respectively media path (step 1104: no), the processing unit 1004 generates 1105 a media path identifier (e.g. a media path identifier (e.g. stream hash value)) for the media stream, respectively media path and stores 1106 the media stream record in the state table as outlined above.

Furthermore, if the media path indicated by the currently processed media packet is not yet correlated to a signaling session identifier, i.e. the state table is not yielding an associated signaling session identifier of the media service to which the media stream/media path belongs, the processing unit 1002 forms a correlation request message indicating at least the media path of the media stream (e.g. by means of the destination IP address and port number) and an identifier of the correlation request message (e.g. sequence number or media path identifier (e.g. stream hash value)) and causes the transmitting unit 1005 of the media plane probe 403 to send 1107 the correlation request message to the correlation unit 402. This correlation request message may be implemented as a CORR_MSG_REQUEST message containing the media path information, and the previously created media path identifier (e.g. stream hash value) or sequence number.

Upon reception 1108 of a correlation response from the correlation unit 402, the media plane probe 403 updates 1109 the internal state table with the signaling session identifier for the media data path of the media stream that has been indicated in a correlation request message. The correlation response message may be implemented as a CORR_MSG_RESPONSE message containing the signaling session identifier corresponding to the queried media path, and a media path identifier (e.g. stream hash value) or a sequence number of the correlation request message. To identify the correct state table entry of the media data path to which the signaling session identifier belongs, the detection unit 1002 could for example utilize the media path identifier (e.g. stream hash value) contained in the correlation response message. Alternatively, the detection unit 1002 could derive the media data path corresponding to the signaling session identifier of the correlation response message by matching a sequence number of the correlation response message to a correlation request message having the same sequence number and thereby identifying the media data path to which the signaling session identifier belongs. If no entry is found in the state table the correlation response is discarded. If a state table entry is found the entry is updated by attaching the signaling session identifier value of the signaling session to the media stream in the state table. This step links the signaling session and media stream in the media plane probe 403 state table which may be stored in storage unit 1003. Upon having processed the media packet, the media plane probe 403 may discard same.

In a further example embodiment of the invention, the media plane probe's processing unit 1004 may periodically (e.g. every 5 seconds) check all entries in the state table in order to identify and process media streams that have ended. For this purpose, the media plane probe 403 may also timestamps indicating the last update of the respective state table entries. A media stream may be for example considered terminated, if no new media packets have been received by the monitoring unit 1001 for the existing media stream for a given amount of time (e.g. 60 seconds). Upon termination of a media stream, the processing unit 1004 processes the respective information from the state table and generates a media stream database record. The media plane probe 403 deletes the media stream from the state table.

In a further embodiment of the invention, in response to the termination of a media data path of a given session, the media plane probe 403 may deregister the terminated media data path for a given signaling session at the correlation unit 402. The media plane probe 402 therefore sends a media data path deregistration message to the correlation unit 402. This message comprises the terminated media data path and the signaling session identifier of the signaling session to which the media data path has been associated. In more detail, upon the detection unit 1002 detecting the termination of a media data path, the detection unit 1002 obtains the associated signaling session identifier from the state table maintained in the storage unit 1003 and passes the information to the processing unit 1004. The processing unit 1004 forms the deregistration message indicating the terminated media data path and the associated signaling session identifier and causes the transmitter unit 1005 to transmit the media data path deregistration message to the correlation unit 402 via a network interface card 1006.

Optimizations may be used to speed up processing of entries in the state tables inside the signaling plane probe 401, the correlation unit 402 and the media plane probe 403. A simple list would be sufficient to implement the features as outlined above. Add, modify, delete and search operations on simple lists may however be too slow. These operations may be implemented utilizing more complex but faster data structures, e.g. hash tables or data structures heavily dependent on CPU and Operating System specific behavior and functionality. The Intel Thread Building Block (TBB) library for instance can be used to implement in-memory databases used for the state tables in the signaling plane probe 401, the correlation unit 402 and the media plane probe 403. The Intel Thread Building Block (TBB) library may also be used to aid implementation of the processing queues inside and in between the components outlined above.

Please note that in case the media plane probe should perform passive non-intrusive monitoring of the signaling plane traffic, respectively media plane traffic, a separate network interface card is employed for the transmission of correlation related messages (i.e. the network interface card(s) for monitoring the traffic are only employed for packet reception but not for packet transmission).

Please also note that in the procedures described above the detection unit 1002 and the processing unit 1002 may use the database access unit 1007 to access the database/state table in the storage unit 1003.

Improvement of the Candidate System

In the exemplary embodiments outlined above, the media paths belonging to a given service (i.e. signaling session) have been learned from the signaling plane of the service. To assure a better hit ratio of the signaling plane—to media plane—correlation the signaling plane probe 401 may provide additional information to the correlation unit 402.

In the exemplary embodiments above, the correlation of media streams is based on destination IP address and port tuple information. This is due to the signaling protocols are typically standardized to only specify and exchange information on the destination of a media stream rather than the source. To improve the hit ratio, the signaling plane probe 401 may learn additional candidate IP address and port tuples by examination of the signaling plane traffic at service set up and even after service set up. The signaling plane traffic may contain additional media stream information, for example such as secondary communication paths which are propagated during the set up of the service. Additionally, for example the properties of a VoIP session may change throughout the session, i.e. when the session is redirected or the used media codecs are changed. These updates on the signaling plane happen inside a specified signaling session and can thus be assigned to the existing signaling session identifier value. The signaling plane probe 401 detects these new communication paths and updates the correlation unit 402 by sending additional registration messages within the same signaling session identifier context.

More communication path candidates may be also obtained by dissecting the signaling protocols beyond the level intended by the standards. For example, while a VoIP endpoint behind a Network Address Translation (NAT) device might not be aware of its external IP address it might be on the packet-switched network where a signaling plane probe taps into the packet-switched network. The signaling plane probe 401 may analyze applicable signaling plane information and deduct possible media data paths which could lead to the VoIP endpoint. Sources for additional candidate media data path information include SIP routing information headers (Via, Route, Record-Route) as well as SIP extensions like ICE and TURN defined by the IETF. Every SIP message which modifies the media data path(s) may be a source for additional candidates. SIP and other signaling protocols may use additional headers or combinations of headers as source for candidates with variable reliability. Similar mechanisms may be employed by VoIP entities part of the VoIP provider to increase the service quality in NAT or firewall environments.

The correlation mechanism according to another embodiment of the invention allows considering these learned candidate media data paths. Furthermore, a ranking of the reliability of the candidate media paths belonging to a given media service may be introduced to account for the candidate media data paths being learned from sources considered less reliable compared to the media paths learned from the VoIP endpoints, e.g. as part of a SDP negotiation. To add a grading possibility each candidate media path the signaling plane probe 401 may assign a reliability index to the respective candidate media data paths. The more reliable the source of the candidate media data path is, the higher (or lower) the reliability index of the candidate media data path. Media data paths learned from the VoIP endpoints may be assigned the highest reliability, while media data paths learned from the other sources, such as SIP routing information headers and SIP extensions may be considered less reliable.

As mentioned earlier, it is possible that the correlation unit's database contains multiple entries for one IP address and port tuple, for instance when operating in an environment where additional candidate media paths of a service are learned from less reliable sources. Media path entries in the database may have different signaling session identifiers and different reliability as they belong to different services. For example for VoIP sessions, multiple VoIP calls originating from behind the same Network Address Translation (NAT) device may yield the same IP address and port tuple for different signaling session identifiers. A correlation request processed by the correlation unit 402 may thus results in two or more possible signaling session identifiers. In this case, the correlation unit may return the entry with the highest reliability to the media plane probe 403.

In another embodiment of the invention, the media plane probe 403 component also contributes candidate media paths for correlation. In VoIP networks, media gateways like Soft Switches (SSW), or VoIP application servers (e.g. voice-mail systems) may detect NAT or firewalls on the media plane. As a result these devices pro-actively or after a certain trigger deviate from the media data path advertised on the signaling plane and utilize a different media path to reach the VoIP endpoint. The resulting media stream may thus become bound to an IP address and port different from the one observed by the signaling plane probe 401. A correlation requests by the media plane probe 403 would thus fail.

In the following, an exemplary embodiment of a message exchanged between caller, callee and firewall is exemplified with respect to FIG. 12, which allows the media plane probe 403 to learn a candidate media data path not indicated in the signaling plane. In more detail, a possible VoIP service flow is exemplified which includes signaling and media information across a firewall. In this scenario, a VoIP caller tries to communicate with a VoIP callee. In between the entities a firewall protects the network of the caller. The caller sends 1201 a session setup request to the callee on the signaling plane which is indicating the media data path (IP address and port tuple of the caller) to be used for communication with the caller. The callee responds 1202 with a session setup response message indicating a successful session setup (and indicating the media data path through which the callee can be reached, e.g. IP address and port tuple of the callee). The callee starts sending 1203 media data stream on the media plane to the caller's IP address and port (destination address tuple) indicated during session setup. The firewall detects and filters out the media data stream from the callee to the caller. To inform the callee about the actions taken by the firewall, i.e. the blocking of the media stream, an error message (e.g. an ICMP error message) is sent 1204 on the media plane to the callee. Further media packets from the callee towards the caller on this communication path also trigger the same error message.

At this point, the caller starts sending 1205 a media data stream to the callee on the media plane using the IP address and port number as indicated by the callee during session setup as a destination address tuple and using its IP address and a port number as the source address tuple. The callee receives the media stream and learns thereby from the source address tuple that communication on this media data path (i.e. the source address tuple as used by the media stream in step 1203) is possible. The callee deviates from the media data path information as exchanged during the session setup on the signaling plane and sends 1206 his media stream to the caller on the same media data path as the caller sent his, employing the source address tuple used by the media stream in step 1203 as the destination address tuple for the media stream packets destined to the caller.

Assuming that the media plane probe 403 has been able to monitor the media traffic exchanged by callee and caller, the media plane probe 403 may learn the media path learned in step 1205 by the media plane probe 403 may be added as a candidate media path for the VoIP service at correlation unit's database for future correlations. This media path is the reverse direction of the media stream received. The media plane probe 403 sends in addition to the destination IP address and port number, source IP address and port number of the media path learned in step as part of the correlation request message. If the correlation unit 402 successfully identifies a registered signaling session for the media stream based on the destination IP address and port number of the correlation request, it may automatically assign the new media path to the same signaling session identifier of the identified signaling session, the new media path being defined by the source IP address and port number, which is now used as a candidate destination IP address and port number for correlation. The reliability of this new candidate media path may be marked lower than the reliability of the media path defined by "true" destination IP address and port tuples in the database of the correlation unit 402.

Determination of the Signaling Session Identifier and Media Path Identifier

In one embodiment of the invention, the signaling session identifier and/or the media path identifier (e.g. stream hash value) may be a hash value. The hash value is unique for at least a certain time across multiple networked devices. Since multiple devices (e.g. signaling plane probes and media plane probes) may create hash values at the same time uniqueness may be partly achieved by adding a unique string identifying each involved node to the input of the hash function. A good source for a unique string is a MAC address of a network card. These addresses are tied to physical interfaces and the addresses serve a similar purpose in Ethernet based networks. Other but not guaranteed to be unique strings are IP addresses or host-names of the involved signaling plane probe or media plane probe. Hence, the signaling session identifier and/or the media path identifier may be for example determined based on at least one of addresses or host-names of the involved signaling plane probe or media plane probe, and a MAC address of the network interface card in the respective probe In another embodiment of the invention, an alternative or additional input to the hash function may be a time-stamp which would ensure uniqueness of the hash value. For example, a high-resolution time-stamp may be used for determining the signaling session identifier and/or the media path identifier. A time-stamp may not be distinct if multiple signaling session identifier values have to be calculated within the same time-frame. In this case, a further improved exemplary implementation considers a counter value in addition to the time-stamp in the hash value generation for the signaling session identifier and/or the media path identifier. The counter may be monotonously increment for each signaling session identifier, respectively media path identifier created.

The hash function to determine the hash value may be a simple concatenation of one or more of the input parameters discussed above. For example, the resulting tuple of a host identifier (i.e. MAC address), a time-stamp and a counter value may be used for defining the signaling session identifiers and/or the media path identifiers. The resulting concatenation of these values could either be the signaling session identifier value itself or can be used to calculate a signaling session identifier value.

Of course more complex mechanism may also be used to calculate a hash value representing the signaling session identifiers and/or the media path identifiers. For example the MD5 message digest function (see IETF RFC 1321, "The MD5 Message-Digest Algorithm", 1992, available at http://www.i-etf.org) could be used to create a valid hash value. The MD5 message digest function may be fed with a concatenation of the respective probe's the MAC address, a time-stamp and counter value and the resulting string can be used as the signaling session identifier value or the media path identifier. Another hash function that could be used may be selected from the SHA cryptographic hash function family (see FIPS PUB-180, "Secure Hash Standard (SHS)", 2008 available at http://www.itl.nist.gov/fipspubs/).

The correlation mechanism for signaling plane and media plane of a service may be used in manifold applications. For example, the correlation mechanism is useful in small networks but is more important in larger scale networks where the various signaling and media components are decomposed and present on different, sometimes geographically split, network entities. This is the case in IP Multimedia Subsystem (IMS) or Next Generation Network (NGN) setups.

Figure 13:
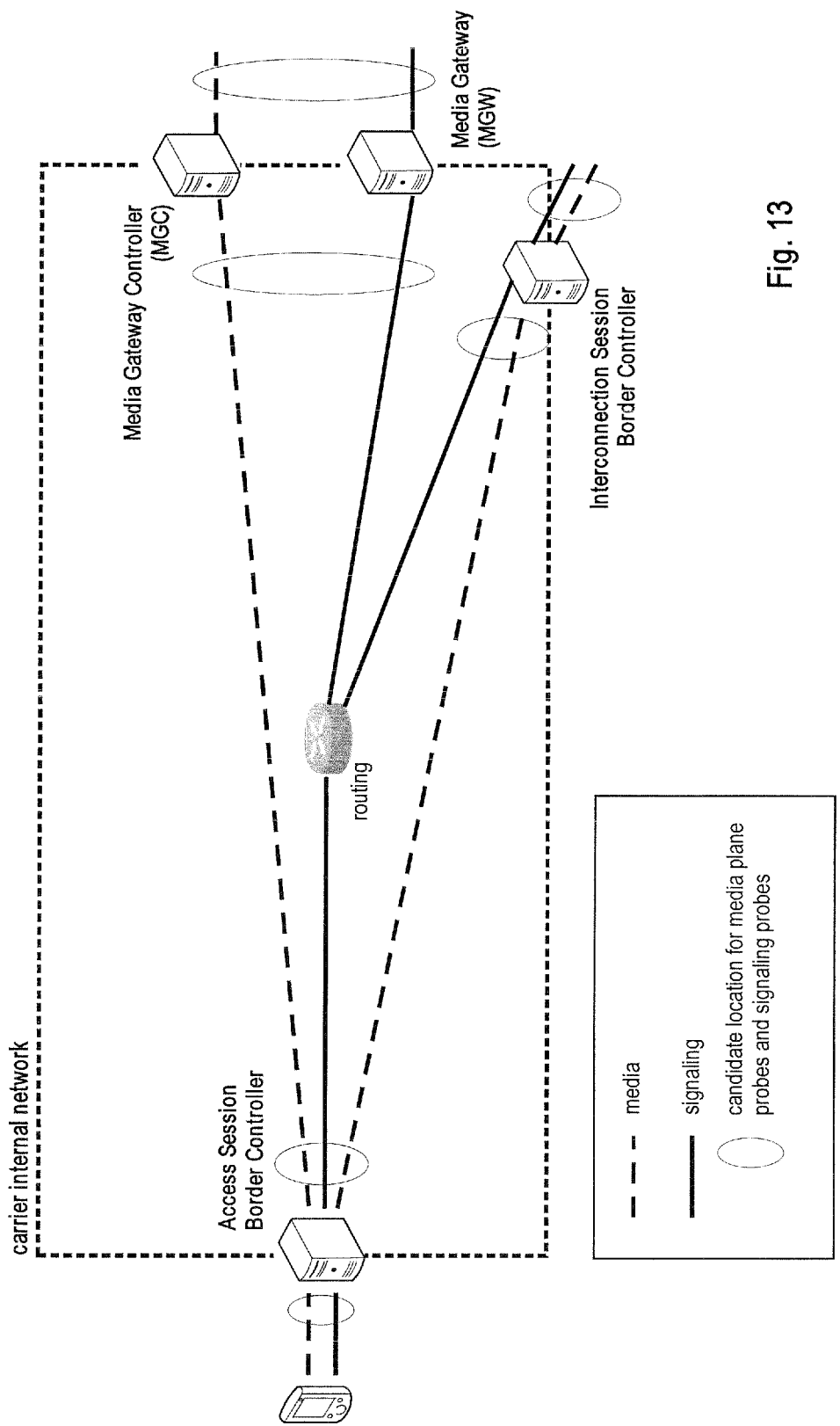
FIG. 13 shows a network in which locations are indicated, where signaling and media plane probes of the invention may be advantageously located according to an embodiment of the invention.

FIG. 13 shows a simplified network in which locations are indicated where correlation may be desired and can be implemented using the correlation mechanism according to one of the various embodiments described herein. Possible monitoring locations are for example (and not limited thereto):

The Access Session Border Controller (SBC) network interfaces with end customers (shown of the left side of FIG. 13), a decomposed gateways system, e.g. to the PSTN, is shown as Media Gateway (MGW) and a Media Gateway Controller (MGC)—see In the top right section of FIG. 13, and an Interconnection SBC interfaces to one or more interconnection or transit partners (see the lower right side of FIG. 13).

It should be noted that the location of the monitoring probes for signaling plane and media plane may also be subject to a customer's request and requirements on the monitoring solution.

In some cases, signaling plane and media plane may originate and/or terminate at the same endpoint (device). In case of an end customer this endpoint most likely uses the same IP address on the signaling and media plane. These streams may be for example observed, if the signaling plane probes 401 and the media plane probes 403 are placed close to the end customer devices. The Access Session Border Controller may be considered to be close to the carrier internal network's "border" towards end customer devices and to therefore receive traffic from the end customers on one side and transmits this traffic on the other side towards the carrier internal network. Most commonly these Session Border Controllers (SBC) are used to separate the devices outside the own trust domain from the inside network. Although the traffic is in one geographic location the SBC may use different IP addresses to load balance traffic. In this case a simple IP address based correlation mechanism not using the principles and ideas outlined herein would already fail whereas the correlation mechanism described herein would succeed. The signaling plane probes 401 and media plane probes 403 may be for example placed in a way that they observe the signaling streams and media streams respectively.

Figure 12:
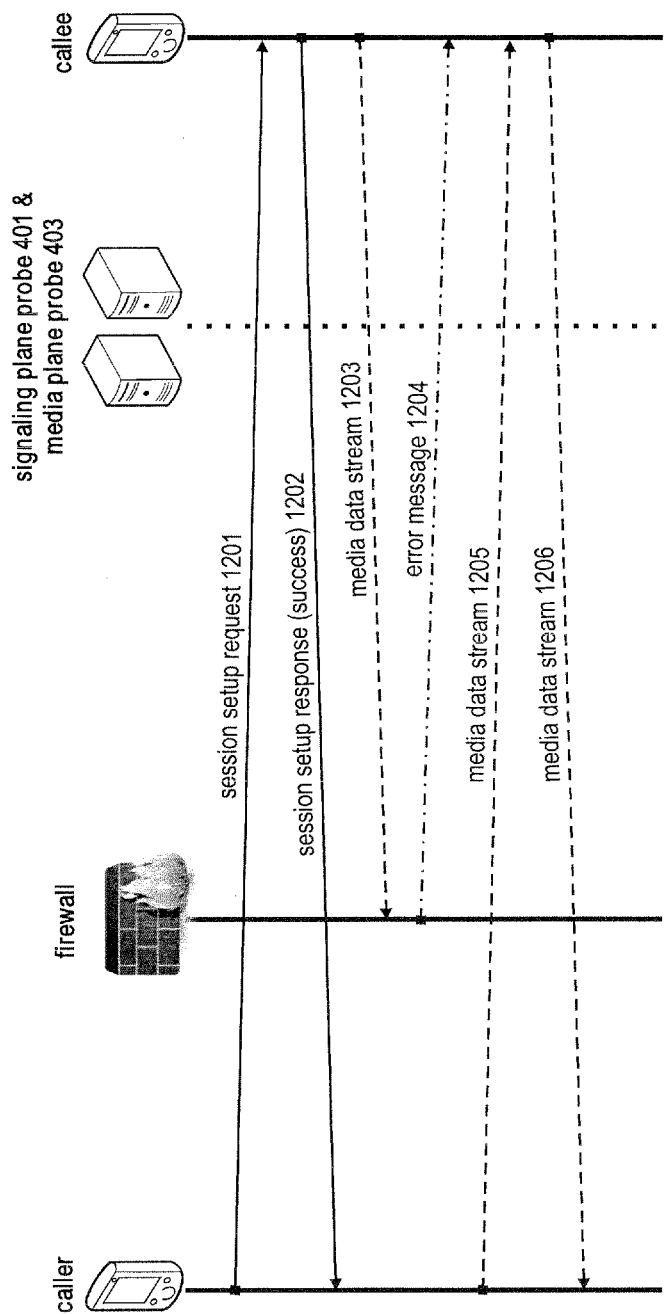
FIG. 12 shows an exemplary exchange of messages between caller, callee and firewall to highlight the learning of a candidate media data path according to an exemplary embodiment of the invention.

In the upper right corner of the diagram shown in FIG. 12, a decomposed gateway is shown which uses different physical entities as media and signaling components (MGC and MGW, respectively). In between those devices a third party protocol may be used to synchronize the devices. For the sake of a minimum size network diagram only one of each component types is shown but in real life scenarios multiple media components are controlled by one signaling component (as it is the case in IMS, NGN). The media components may be co-located in the same location with the signaling component or spread across the internal network of the carrier. In either case the correlation task is rather complex as it involves multiple IP addresses on different physical network links and thus may require multiple signaling plane probes 401 and media plane probes 403.

In a third exemplary scenario the correlation has to correlate signaling and media streams from different locations. A media plane probe 403 component on the internal side of the interconnection point (lower right corner of the diagram—Interconnection SBC) observes a media stream from the Access SBC (middle left). The corresponding signaling session is observed next to the aforementioned Access SBC by a separate signaling plane probe 401.

In the different embodiments outlined above, it has been most of the time assumed that the correlation is conducted by one correlation unit 402 which receives messages from multiple singing plane probes 401 and media plane probes 403. There is no apparent limitation on the number of entities involved or the maximum distance between the devices. The signaling session identifier and using the proposed correlation mechanisms allow correlation of signaling stream and media streams of respective media services. The correlation enables the network operator to form calls from the signaling streams and media streams. Calls can then be processed for Quality of Service analysis tasks (i.e. troubleshooting or Service Level Agreements) or billing purposes.

The location of the correlation unit 402 does not impact what signaling sessions or media streams can be correlated. The correlation unit 402 should be of course reachable by all singling plane probes 401 and media plane probes 403 and can be implemented as distinct physical machine or co-located on an existing singling plane probe 401 or media plane probe 403.

An alternative implementation according to another embodiment of the invention co-locates the correlation unit 402 on all media plane probes 403. The signaling plane probes 401 may use multicast to address their correlation related messages to the multiple correlation unit 402 instances on the media plane probes 403. The signaling plane probes 401 would send their messages to a multicast address of a multicast group to which all control units 403 belong. As a result the message reaches all correlation units 402 on the media plane probes 403. If multicast is not available the signaling plane probes 401 may duplicate the data by sending out multiple unicast messages to the correlation units 402. A combination of both mechanisms (multicast and unicast) is also possible.

The co-location of correlation units 402 on media plane probes 403 may be advantageous as the latency in the messages exchanged between the correlation units 402 and media plane probes 403 is minimal allowing for a fast correlation speed. In addition it reduces the impact of network outages or failure of a single correlation unit 402 in the packet-switched network. In case of implementing a correlation unit 402 and a media plane unit 403 in the same device, local transport method for the correlation requests and responses, such as for example a socket based Inter-Process Communication (IPC) can be used.

Message Generation and Transmission

In the description above, different messages have been sent by signaling plane probe 401, media plane probe 403 and the correlation unit 402. In one exemplary embodiment of the invention, all correlation related messages transmitted sent by signaling plane probe 401, media plane probe 403 and the correlation unit 402 (i.e. signaling session registration and deregistration messages, the correlation request messages and correlation response messages; and the media data path deregistration messages) are messages in the application layer that are passed through the lower layer protocols for transmission on the packet-switched network. In particular, these messages may be sent as UDP datagrams over an IP-based network.

Please further note that the correlation related messages do further not require a retransmission mechanism to ensure their delivery to the target host, but are send following the "send and forget" paradigm as for example provided in the UDP protocol. However, this does of course not exclude the use of reliable lower layer transport mechanisms (e.g. TCP or Layer 2-based retransmission protocols) for transmission of the application layer correlation related messages. In particular, when encapsulating IP based traffic for transport over mobile communication systems (like UMTS-based or LTE-based systems), the mobile communication systems could employ retransmission protocols in their access stratum protocol level.

Furthermore, in another embodiment of the invention, the signaling plane probe 401, media plane probe 403 and the correlation unit 402 could also buffer the correlation related messages and/or send them periodically combined in one or more UDP datagrams. For example, assuming that on a fully loaded 10 Gbps link with typical media service properties (300 second duration), there are approximately 33 new media services (and thus new signaling sessions) established per second. Hence, the signaling plane probe 401 could for example buffer the signaling session registration messages and send the buffered signaling session registration messages every second in a single UDP datagram in predetermined intervals (e.g. every 1 or 2 seconds). If the buffered signaling session registration messages exceed the maximum payload size of 64 kBytes of a UDP datagram, this could trigger a non-periodic transmission of the signaling session registration messages in a UDP datagram. Signaling session registration messages transmitted in a UDP datagram to the correlation unit 402 may be of course removed from the buffer. The signaling plane probe 401 may act on the signaling session deregistration messages in a similar fashion.

Similarly, the media plane probe 403 may also buffer correlation request messages (and/or media data path deregistration messages) and transmit them periodically to the correlation unit 402 in a similar fashion as described for the signaling plane probe 401 above. Regarding the correlation unit 402, same may also buffer the correlation response messages for the respective media plane probes sending correlation request messages and transmit the correlation response messages to the respective media plane probes 403 in single UDP datagrams periodically as described for the signaling plane probe 401 above.

FIG. 14 and FIG. 15 show two exemplary embodiments of signaling session registration messages according to respective embodiments of the invention. The messages could be considered exemplary CORR_MSG_XDRINFO messages as indicated above.

The signaling session registration message in FIG. 14 comprises a message identification field of known size (e.g. two Bytes) set to a predetermined value (CORR_MSG_XDRINFO) to indicate the message format and content. Furthermore, in case it should be able to indicate more than one media data path for the signaling session to be registered, the signaling session registration message comprises a length indication that indicates the message size thereby allowing concluding on the number of media data paths comprised in the message. Also the length indication should be of fixed size (e.g. one byte) and may indicate either the number of media data paths contained in the signaling session registration message, or the size of the message in Bytes. Optionally some reserved space for further extension of the message may be foreseen.

The signaling session registration message may further comprise a field SSID for signaling the signaling session identifier. The field size may be predetermined and may be for example selected based on the size of the hash value when used as a signaling session identifier. Moreover, one or more media data path fields (1 to N), as indicated by the length indication. Each media data path entry indicates an IP address and port tuple. The field size of the media data path field is thus dependent on the size of the IP address (in view of using IPv4 or IPv6 addresses).

FIG. 15 shows another exemplary signaling session registration message that is differing from the signaling session registration message of FIG. 14 only in that there is an additional reliability index field (RI) of given size (e.g. 4 Bits) for each media data path field that indicates the reliability of the association of the given media data path and the signaling session identifier. In an alternative implementation, the reliability index field is part of the media data path field. Strictly speaking, if assuming that the signaling plane probe 401 only learns media data paths from the end-to-end session signaling of the peer devices, and considering these learned media data paths to be reliable, no extra signaling information on the reliability of the media data paths is needed for a signaling session registration message, but the registration management unit 802 of the correlation unit 402 may assign the media data paths learned from signaling session registration messages the highest reliability.

FIG. 16 shows a signaling session deregistration message according to an exemplary embodiment of the invention. The deregistration message may be CORR_MSG_XDREOC message as indicated above. Similar to the messages in FIG. 14 and FIG. 15, also the deregistration message comprises a message identification field of known size (e.g. one byte) set to a predetermined value (CORR_MSG_XDREOC). Furthermore, the signaling session deregistration message comprises the signaling session identifier (SSID) of the signaling session to be deregistered.

FIG. 17 and FIG. 18 show two exemplary embodiments of correlation request messages according to respective embodiments of the invention. The messages could be considered exemplary CORR_MSG_REQUEST messages as indicated above.

The correlation request messages shown in FIG. 17 and FIG. 18 both comprise a message identification field of known size (e.g. one byte) set to a predetermined value (CORR_MSG_REQUEST) to indicate the message format and content.

FIG. 18 shows an exemplary correlation request message that only comprises a message identification field, a single media data path field and a media data path identifier (MDP ID). The media data path entry indicates an IP address and port tuple. The field size of the media data path field may dependent on the size of the IP address (in view of using IPv4 or IPv6 addresses) and thus on the IP addressing scheme used in the target monitored packet-switched network, or alternatively, a fixed field size suitable to cover IPv6 and IPv4 addresses could be used (e.g. 128 bit for IP address plus 16 bit for port number). The media data path identifier is used for associating the correlation response message to the correlation request, respectively, the signaling session identifier in the correlation response message to the media data path in the corresponding correlation request message.

In case it should be able to indicate more than one media data path for the signaling session to be registered, as shown in FIG. 18, the correlation request message comprises a length indication that indicates the message size thereby indicating the number of media data paths comprised in the message. Also the length indication should be of fixed size (e.g. one byte). Optionally some reserved space for further extension of the message may be foreseen.

The correlation request message further comprises one or more media data path fields (1 to N), as indicated by the length indication. The field size of the respective media data path field may dependent on the size of the IP address (in view of using IPv4 or IPv6 addresses) and thus on the IP addressing scheme used in the target monitored packet-switched network, or alternatively, a fixed field size suitable to cover IPv6 and IPv4 addresses could be used (e.g. 128 bit for IP address plus 16 bit for port number). Furthermore, there is a media data path identifier (MDP ID) for each media data path entry, which is used for correlating the information in the correlation response messages from the correlation unit 402 to the corresponding correlation request (i.e. the media data paths for which the correlation request was sent).

FIG. 19 and FIG. 20 show two exemplary embodiments of correlation response messages according to respective embodiments of the invention. The messages could be considered exemplary CORR_MSG_RESPONSE messages as indicated above. The correlation response messages shown in FIG. 19 and FIG. 20 both comprise a message identification field of known size (e.g. one byte) set to a predetermined value (CORR_MSG_RESPONSE) to indicate the message format and content.

FIG. 19 shows an exemplary correlation response message that only comprises a message identification field, a single signaling session identifier field (SSID) and media data path identifier (MDP ID). In case it should be able to respond to correlation requests for more than one media data path, as shown in FIG. 20, the correlation response message comprises a length indication that indicates the message size thereby indicating the number of signaling session identifiers comprised in the message. Also the length indication should be of fixed size (e.g. one byte). Optionally some reserved space for further extension of the message may be foreseen.

The correlation response message further comprises one or more media signaling session identifier fields (SSID), as indicated by the length indication. The field size of the respective Furthermore, there is a media data path identifier (MDP ID) for signaling session identifier field, which is used for correlating the information in the correlation response messages from the correlation unit 402 to the corresponding correlation response (i.e. the media data paths for which the correlation request was sent).

Figure 21:
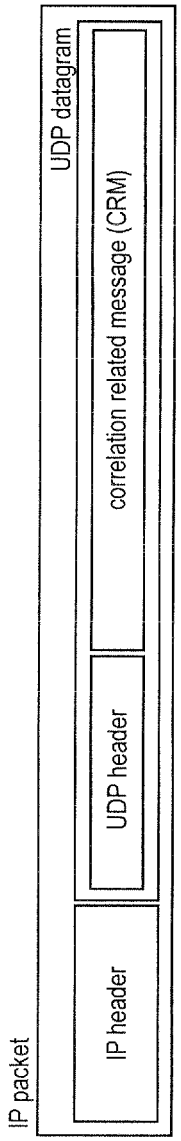
FIGS. 21 & 22 show the exemplary encapsulation of correlation related messages in the UDP layer and IP layer, respectively, according to an exemplary embodiment of the invention.
Figure 22:
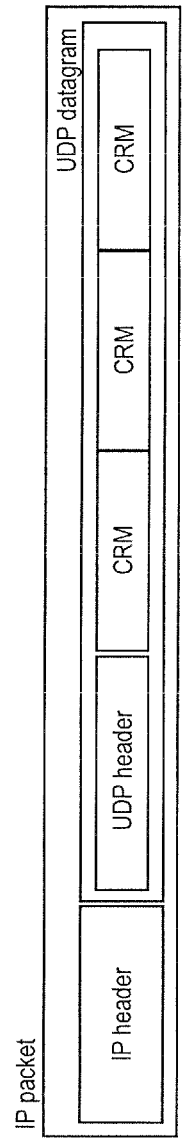

Furthermore, the all correlation related messages, examples of which are shown in FIGS. 14 to 20 may be encapsulated in UDP datagrams and further in IP packets, as shown in FIG. 21 and FIG. 22. It should be noted that either one (FIG. 21) or more (FIG. 22) correlation related messages (CRMs) may be included as payload data in one datagram of the UDP protocol.

In general (i.e. for all data passed for transmission to the UDP layer), the UDP protocol adds the UDP header (which includes inter alia the port number of the source and destination device) to the payload. The UDP datagram may be further encapsulated by the IP layer which is adding its IP header. The IP header comprises inter alia the source IP address and the destination IP address.

For correlation related messages destined to the correlation unit 402, the destination IP address may be a unicast address or a multicast address. The use of a multicast address is advantageous, if the correlation request message(s) should be destined to multiple correlation units in the packet-switched network simultaneously, as indicated above.

The terms probe and correlation unit used herein can be considered to refer to dedicated hardware, a software program or a combination thereof to implement the desired functionality of the respective probe, respectively, correlation unit. Accordingly, another embodiment of the invention relates to the implementation of the above described various embodiments using hardware and software. It is recognized that probes and correlation unit of the invention may be implemented by having computing devices (processors) execute a software program that causes the desired functionality being executed. A computing device or processor may for example be general purpose processors, digital signal processors (DSP), application specific integrated circuits (ASIC), field programmable gate arrays (FPGA) or other programmable logic devices, etc. Some of the computing devices may store the software program internally.

The various embodiments of the invention may also be performed or embodied by a combination of computing devices and software programs providing the desired functionality stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:
1. A method for correlating at least one media data path and a signaling session of a service in a passive monitoring system of a packet-switched network, the method comprising:
   detecting in a signaling plane probe located in the packet-switched network a signaling session of the service, wherein the identification of the signaling session comprises identifying one or more media data paths of the media plane of the service based on signaling information of the signaling session monitored in the signaling probe,
   generating a signaling session identifier for the signaling session of the service at the signaling plane probe,
   registering the signaling session at a correlation unit by transmitting a registration message from the signaling plane probe to the correlation unit, wherein the registration message comprises the signaling session identifier of the signaling session and the one or more media data paths of the service identified by the signaling plane probe,
   receiving at the correlation unit a correlation request message from a media plane probe located in the packet-switched network, wherein the correlation request message indicates a media data path, determining by the correlation unit whether a signaling session of a service for the media data path comprised within the correlation request message is registered at the correlation unit, and if the signaling session is registered at the correlation unit, transmitting a correlation response message from the correlation unit to the media plane probe, wherein the correlation response message comprises the determined signaling session identifier of the signaling session associated with the media data path comprised within the correlation request message.

2. The method according to claim 1, wherein registering the signaling session of the service at the correlation unit comprises the correlation unit storing the generated signaling session identifier and the associated one or more media data paths of the service as indicated in the registration message in a database, and determining by the correlation unit whether a signaling session of the service for the media data path comprised within the correlation request message is registered at the correlation unit comprises checking by the correlation unit, whether the media data path comprised within the correlation request message is stored in the database.

3. The method according to claim 1, further comprising the step of the media plane probe temporarily storing the signaling session identifier comprised in the correlation response message and, the associated media data path comprised in the correlation request.

4. The method according to claim 1, further comprising the steps of:

detecting by the signaling plane probe another media data path of the media plane of the service, wherein the detection is based on signaling information of the service monitored in the signaling probe after having registered the signaling session of the service at the correlation unit, registering the other media data path of the media plane of the service at the correlation unit by transmitting another registration message from the signaling plane probe to the correlation unit, wherein the registration message comprises the other media data path of the media plane of the service and the signaling session identifier of the signaling session of the service, updating the registration of the signaling session of the service at the correlation unit to account for the other media data path.

5. The method according to claim 4, further comprising the following steps performed by the signaling plane probe:

temporarily storing generated signaling session identifiers along with information on the respective signaling sessions of services, and identifying a signaling session identifier associated to the service for which the other data path has been detected based on the stored information on the signaling sessions of services.

6. The method according to claim 1, wherein the media data path is indicated by a destination IP address and port number comprised by packets conveying media plane data of a service.

7. The method according to claim 1, wherein the correlation request message comprises a destination IP address and port number and a source IP address and port number comprised by packets conveying media plane data of a service, and wherein the method further comprises the step of registering a new media data path indicated by the source IP address and port number within the correlation request message for the signaling session of the service at the correlation unit, if the correlation unit has determined that the signaling session of the service for the media data path indicated by the destination IP address and port number comprised within the correlation request message is already registered at the correlation unit.

8. The method according to claim 1, wherein the correlation response message indicates the signaling session identifier of the signaling session associated with the media data path having the most reliable association, in case the media data path is associated to plural signaling sessions of services.

9. The method according to claim 1, further comprising the steps of receiving at the correlation unit a deregistration request message comprising a signaling session identifier, and de-registering by the correlation unit all media data paths associated with the signaling session identifier comprised in the deregistration request message.

10. A signaling plane probe for use in a passive monitoring system of a packet-switched network, the signaling plane probe comprising:

a monitoring unit adapted to receive packets of a service on the packet-switched network, a detection unit adapted to detect a signaling session of the service, by identifying one or more media data paths of a media plane of the service based on signaling information of the service comprised in the received packets, a processing unit adapted to generate a signaling session identifier for the signaling session of the service, a transmitter unit adapted to transmit a session registration message from the to a correlation unit to register the signaling session of the service at a correlation unit, wherein the session registration message comprises the generated signaling session identifier of the signaling session and the one or more media data paths of the service identified by detection unit.

11. The signaling plane probe according to claim 10, further comprising a database access unit adapted to store the generated signaling session identifier in a database along with information on the signaling session of the service.

12. The signaling plane probe according to claim 10, wherein the detection unit is further adapted to detect another media data path of the media plane of the service based on signaling information of the service's signaling session monitored by the signaling probe after having registered the signaling session of the service at the correlation unit, and wherein the transmitting unit is adapted to transmit a registration message to the correlation unit to register the other media data path of the media plane of the service at the correlation unit, wherein the registration message comprises the other media data path of the media plane of the service and the signaling session identifier of the signaling session of the service.

13. A correlation unit for use in a passive monitoring system of a packet-switched network, the correlation unit comprising:

a receiving unit adapted to receive a session registration message from a signaling plane probe, wherein the session registration message comprises a signaling session identifier of a signaling session of a service and the one or more media data paths of the service, and registration management unit adapted to register the signaling session, by storing the signaling session identifier message, the one or more media data paths of the service, optionally, a reliability indication of the reliability of the association between the signaling session and the media data path comprised in the correlation request message in a database, wherein the receiving unit is further adapted to receive a correlation request message from a media plane probe located in the packet-switched network, wherein the correlation request message indicates a media data path, and wherein the correlation unit further comprises a processing unit adapted to determine whether a signaling session of a service is registered in the database for the media data path comprised within the correlation request message; and further adapted to generate a correlation response message comprising the determined signaling session identifier of the signaling session associated with the media data path comprised within the correlation request message, and a transmitting unit adapted to transmit the correlation response message to the media plane probe.

14. A media plane probe for use in a passive monitoring system of a packet-switched network, the media plane probe comprising:

a monitoring unit adapted to receive packets of a plural services on the packet-switched network and adapted to detect media data paths of media streams of the services from the received packets, a processing unit to generate a correlation request message indicating a media data path of a service detected by the monitoring unit, a transmitter unit adapted to transmit the correlation request message to a correlation unit, and a receiving unit adapted to receive a correlation response message from the correlation unit, wherein the correlation response message comprises a signaling session identifier of the signaling session associated with the media data path comprised within the correlation request message.

* * * * *